(12) United States Patent
Takeuchi et al.

(10) Patent No.: US 11,397,853 B2
(45) Date of Patent: Jul. 26, 2022

(54) WORD EXTRACTION ASSISTANCE SYSTEM AND WORD EXTRACTION ASSISTANCE METHOD

(71) Applicant: HITACHI, LTD., Tokyo (JP)

(72) Inventors: Tadashi Takeuchi, Tokyo (JP); Takaaki Haruna, Tokyo (JP)

(73) Assignee: HITACHI, LTD., Tokyo (JP)

( * ) Notice: Subject to any disclaimer, the term of this patent is extended or adjusted under 35 U.S.C. 154(b) by 130 days.

(21) Appl. No.: 16/711,008

(22) Filed: Dec. 11, 2019

(65) Prior Publication Data

US 2020/0193090 A1 Jun. 18, 2020

(30) Foreign Application Priority Data

Dec. 12, 2018 (JP) .............................. JP2018-232580

(51) Int. Cl.
*G06F 17/00* (2019.01)
*G06F 40/226* (2020.01)
*G06F 40/242* (2020.01)
*G06K 9/62* (2022.01)
*G06N 20/00* (2019.01)
(Continued)

(52) U.S. Cl.
CPC .......... *G06F 40/226* (2020.01); *G06F 40/242* (2020.01); *G06F 40/268* (2020.01); *G06K 9/6262* (2013.01); *G06N 20/00* (2019.01); *G06V 30/414* (2022.01)

(58) Field of Classification Search
CPC .... G06F 40/226; G06F 40/242; G06F 40/268; G06K 9/6262; G06K 9/00463; G06K 9/6218; G06K 9/00442; G06N 20/00
See application file for complete search history.

(56) References Cited

U.S. PATENT DOCUMENTS

2004/0181759 A1* 9/2004 Murakami ............ G06F 16/374 715/259
2012/0011428 A1* 1/2012 Chisholm ............ G06F 16/313 715/230

(Continued)

FOREIGN PATENT DOCUMENTS

JP 2005-092253 A 4/2005

OTHER PUBLICATIONS

Gupta et al., Summarizing Text by Ranking Text Units According to Shallow Linguistic Features, 2011, ICACT, pp. 1620-1625; (Year: 2011).*

(Continued)

*Primary Examiner* — Andrew T McIntosh
(74) *Attorney, Agent, or Firm* — Foley & Lardner LLP

(57) ABSTRACT

A word extraction assistance system includes: a storage device that stores a document archive that is a subject of following steps, and a dictionary that defines relations between words; and a calculation device that performs the step of comparing a document contained in the document archive with the dictionary, and thus generating candidate-for-structured-data related to relations between predetermined words, the step of performing determination of validity of the candidate-for-structured-data, based on certainty of the candidate-for-structured-data, and the step of adding the candidate-for-structured-data to the dictionary, based on a result of the determination of validity.

6 Claims, 22 Drawing Sheets

(51) Int. Cl.
*G06F 40/268* (2020.01)
*G06V 30/414* (2022.01)

(56) References Cited

U.S. PATENT DOCUMENTS

2014/0173425 A1* 6/2014 Hailpern ................ G06F 16/35
715/256
2016/0217128 A1 7/2016 Baum et al.

OTHER PUBLICATIONS

Park et al, Automatic Glossary Extraction: Beyond Terminology Identification, 2002, IBM, 1-7 (Year: 2002).*
Notice of Reasons for Refusal in corresponding Japanese Application No. 2018232580 dated Apr. 12, 2022.
Shin et al., "Incremental Knowledge Base construction Using DeepDive", Cornell University, 2015.

* cited by examiner

FIG. 4  INFORMATION-ON-RELATIONS-THAT-WILL-BE-EXTRACTED 117

| TYPES-OF-HIDDEN-RELATIONS-THAT-WILL-BE-EXTRACTED | NAMES OF DEVICES AND NAMES OF PROCESSES | | | | 1174 |
|---|---|---|---|---|---|
| DICTIONARY-OF-NAMES-OF-DEVICES-AND-NAMES-OF-PROCESSES | DICTIONARY OF KEYWORDS 1 | PROGRAMMED ROUTE CONTROL (PRC) | TRAFFIC INFORMATION DISPLAY (TID) | CENTRALIZED TRAFFIC CONTROL (CTC) | ... |
|  | DICTIONARY OF KEYWORDS 2 | RECEIPT PROCESS | TRANSMISSION PROCESS | TIMER PROCESS | ... |
|  | RELATION DICTIONARY | (PRC, RECEIPT PROCESS, f) | (TID, TIMER PROCESS, f) | (CTC, TIMER PROCESS, f) | 1171 |
| INFORMATION-ON-SERVERS-THAT-CAN-EXTRACT-HIDDEN-RELATIONS |  | IP ADDRESS OF SERVER 1 | IP ADDRESS OF SERVER 2 | IP ADDRESS OF SERVER 3 | 1173 |
| SYNONYM DICTIONARY | NAME OF DEVICE | NAME OF DEVICE (SYNONYM) | | | 1172 |
|  | TID | TRAFFIC INFORMATION DISPLAY | | | |
|  | ... | ... | | | |
|  | NAME OF PROCESS | NAME OF PROCESS (SYNONYM) | | | |
|  | RECEIPT PROCESS | RECEIPT STEP | | | |
|  | ... | ... | | | |

FIG. 5

CANDIDATE-FOR-HIDDEN RELATION ~161

| KEYWORD 1 | KEYWORD 2 | PROBABILITY OF EXISTENCE OF RELATION |
|---|---|---|
| YESTERDAY | TID | 0.02 |
| TID | DISPLAY PROCESS | 1 |
| DISPLAY PROCESS | STOP | 0 |

FIG. 6

DOCUMENT IDENTIFICATION RULE

| SECTION OF DOCUMENT | KEYWORD |
|---|---|
| BEGINNING OF FRONT PAGE | FUNCTION SPECIFICATION |
| HEADER | FAULT REPORT |
| WITHIN FIRST ONE-HUNDRED WORDS | TITLE: [FAULT REPORT] |
| ⟨none⟩ | ⟨none⟩ |

RESULT-OF-MORPHOLOGICAL-ANALYSIS 900

| ID OF DOCUMENT | ID OF SENTENCE | WORD | LEMMA | PART OF SPEECH |
|---|---|---|---|---|
| 1 | 1 | YESTERDAY | YESTERDAY | NOUN |
| 1 | 1 | , | , | MARK |
| 1 | 1 | TID | TID | NOUN |
| 1 | 1 | OF | OF | PARTICLE |
| 1 | 1 | DISPLAY PROCESS | DISPLAY PROCESS | NOUN |
| 1 | 1 | GA | GA | PARTICLE |
| 1 | 1 | STOP | STOP | NOUN |
| 1 | 1 | DID | DO | VERB |
| ... | ... | ... | ... | ... |
| 1 | 12 | BE DONE | DO | VERB |
| 2 | 1 | TOKYO STATION | TOKYO STATION | NOUN |
| ... | ... | ... | ... | ... |

FIG. 11

CANDIDATE-FOR-HIDDEN-RELATION 161

| CANDIDATE-FOR-HIDDEN-RELATION | | FEATURE | | | |
|---|---|---|---|---|---|
| KEYWORD 1 | KEYWORD 2 | WORD_IN_BETWEEN | KW1_in_dict | KW2_in_dict | ... |
| YESTERDAY | TID | {} | f | t | ... |
| TID | DISPLAY PROCESS | {OF} | t | t | ... |
| DISPLAY PROCESS | STOP | {GA} | f | f | ... |

| LABEL | PROBABILITY OF EXISTENCE OF RELATION |
|---|---|
| nil | 0.02 |
| t | 1 |
| f | 0 |

FIG. 14

WEIGHTING INFORMATION ~1300

| FEATURE | WEIGHTING INFORMATION |
|---|---|
| WORD_IN_BETWEEN_[AND] | 1.234 |
| WORD_IN_BETWEEN_[GA] | −0.012 |
| ... | |

FIG. 22

Input(plain text)

B.Ork and his wife M.Ork···,

Mako-san decided to reject marriage with Ko-san ···,

A.Mark married with R.Katt···

Candidate generation and feature extraction

| candidate | | feature | | |
|---|---|---|---|---|
| | | Words in between | distance | ··· |
| B.Ork | M.Ork | {and, his, wife} | 3 | |
| Mako-san | Ko-san | {decided, to, ···} | 5 | |
| A.Mark | R.Katt | {married, with} | 2 | |
| | | | | |

Supervision

| candidate | | feature | | | label |
|---|---|---|---|---|---|
| | | Words in between | distance | ··· | |
| B.Ork | M.Ork | {and, his, wife} | 3 | | nil |
| Mako-san | Ko-san | {decided, to, ···} | 5 | | f |
| A.Mark | R.Katt | {married, with} | 2 | | t |
| | | | | | |

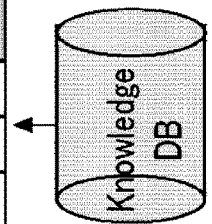

Knowledge DB

Learning and inference

| candidate | | feature | | | label | proba-bility |
|---|---|---|---|---|---|---|
| | | Words in between | distance | ··· | | |
| B.Ork | M.Ork | {and, his, wife} | 3 | | nil | 0.98 |
| Mako-san | Ko-san | {decided, to, ···} | 5 | | f | 0 |
| A.Mark | R.Katt | {married, with} | 2 | | t | 1 |
| | | | | | | | ary that defines relations between words; and a calculation device that performs the step of comparing a document contained in

WORD EXTRACTION ASSISTANCE SYSTEM AND WORD EXTRACTION ASSISTANCE METHOD

CROSS-REFERENCE TO RELATED APPLICATIONS

The present application claims priority pursuant to 35 U.S.C. § 119 from Japanese Patent Application No. 2018-232580, filed on Dec. 12, 2018, the entire disclosure of which is incorporated herein by reference.

BACKGROUND OF THE INVENTION

1. Field of the Invention

The present invention relates to a word extraction assistance system and a word extraction assistance method.

2. Description of the Related Art

To deal with various inquiries from users about faults and failures of products and services that have occurred, or a risk pointed out by a design department that modification of a product code may cause, a quality management department or a customer service department in a company and the like retrieves, from a predetermined document archive, similar documents (fault reports and plans).

To facilitate the retrieval of such similar documents, there are various techniques that show, to a user, synonyms and related words of retrieved keywords. From the shown synonyms and related words, the user selects appropriate synonyms and related words. Consequently, efficiency and accuracy of the retrieval are improved.

As one example of proposals related to the techniques, a data-for-machine-learning generating system (see JP 2005-92253 A) generates data-for-machine-learning from a collection of data-that-has-not-been-learned, and includes: an initial-data storing unit that stores initial data that is data-for-machine-learning that has been evaluated; a data-that-will-be-learned generating unit that generates data-that-will-be-learned from the initial data; a data-that-has-not-been-learned storing unit that stores data-that-has-not-been-learned that has not been evaluated; a machine-learning unit that uses the data-that-will-be-learned to perform machine learning; an evaluating unit that, based on a result of the learning of the machine-learning unit, forecasts valuation on the data-that-has-not-been-learned, and outputs certainty of the forecast valuation; and an initial-data updating unit that adds, to the initial-data storing unit, the data-that-has-not-been-learned whose certainty of the forecast valuation meets a predetermined condition.

SUMMARY OF THE INVENTION

To show synonyms and related words as described above, the synonyms and related words need to be preliminarily extracted from documents in a predetermined document archive.

As one example of proposed basic techniques related to such a process, a result of a morphological analysis of documents in a document archive is applied to a predetermined dictionary (structured data that defines relations between words) and information for identification (synonym dictionary). Consequently, relations between words are determined (see FIG. 22, for example). Refer to "Incremental knowledge base construction using DeepDive" in The VLDB Journal 2017, Volume 26, pp. 81-105.

According to the above technique, a system extracts features, such as words (words in between) between a set of a word 1 and a word 2 (candidate-for-structured-data) that are contained in a document (input), and a distance between a word in between and the word 1, and a distance between a word in between and the word 2. The system compares the features with machine-learning data that is past knowledge (knowledge data base (DB)), and thus determines a validity (label). Consequently, the system estimates a probability of existence of a relation between the set of the words.

Validity of a result of the estimation is determined by a domain expert related to extraction of synonyms and related words. The domain expert requests a data scientist to supply data that forms grounds for the result of the determination of validity of a result of the estimation.

The data scientist determines data that forms grounds, and supplies the data that forms grounds to the domain expert. In addition, the data scientist investigates a cause of the above invalid estimation of the probability of existence of a relation, and prepares a countermeasure. Accordingly, the data scientist modifies algorithms used to extract synonyms and related words, and adds documents as teaching data to the document archive.

The determination of validity by the domain expert, tasks by the domain expert and the data scientist (the request for data that forms grounds, the supply of data that forms grounds, the investigation into a cause, and the preparation of the countermeasure), the modification of algorithms used for extraction modified by the data scientist, and the addition of documents as teaching data added by the data scientist are processes necessary for improvement of accuracy of extraction of synonyms and related words, but are main factors that increase tasks.

An object of the present invention is to provide a technique that efficiently and accurately extracts synonyms and related word.

An aspect of the present invention provides a word extraction assistance system that solves the above problems and includes: a storage device that stores a document archive that is a subject of following steps, and a dictionary that defines relations between words; and a calculation device that performs the step of comparing a document contained in the document archive with the dictionary, and thus generating candidate-for-structured-data related to relations between predetermined words, the step of performing determination of validity of the candidate-for-structured-data, based on certainty of the candidate-for-structured-data, and the step of adding the candidate-for-structured-data to the dictionary, based on a result of the determination of validity.

Another aspect of the present invention provides a word extraction assistance method, wherein an information processing system includes a storage device that stores a document archive that is a subject of following steps, and a dictionary that defines relations between words, and the information processing system performs the step of comparing a document contained in the document archive with the dictionary, and thus generating candidate-for-structured-data related to relations between predetermined words, the step of performing determination of validity of the candidate-for-structured-data, based on certainty of the candidate-for-structured-data, and the step of adding the candidate-for-structured-data to the dictionary, based on a result of the determination of validity.

According to the present invention, synonyms and related words are efficiently and accurately extracted.

BRIEF DESCRIPTION OF THE DRAWINGS

FIG. 4 is a table that illustrates examples of contents of information-on-relations-that-will-be-extracted according to the present preferred embodiment;

FIG. 5 is a table that illustrates examples of contents of candidates-for-hidden-relations according to the present preferred embodiment;

FIG. 6 is a table that illustrates examples of contents of document identification rules according to the present preferred embodiment;

FIG. 10 is a table that illustrates an example of a result of a morphological analysis according to the present preferred embodiment;

FIG. 11 is a table that illustrates examples of the candidates-for-hidden-relations according to the present preferred embodiment;

FIG. 14 is a table that illustrates examples of weighting information according to the present preferred embodiment;

FIG. 22 is tables that illustrate a basic technique of extraction of words.

DESCRIPTION OF THE PREFERRED EMBODIMENT

—System Configuration—

Figure 1:
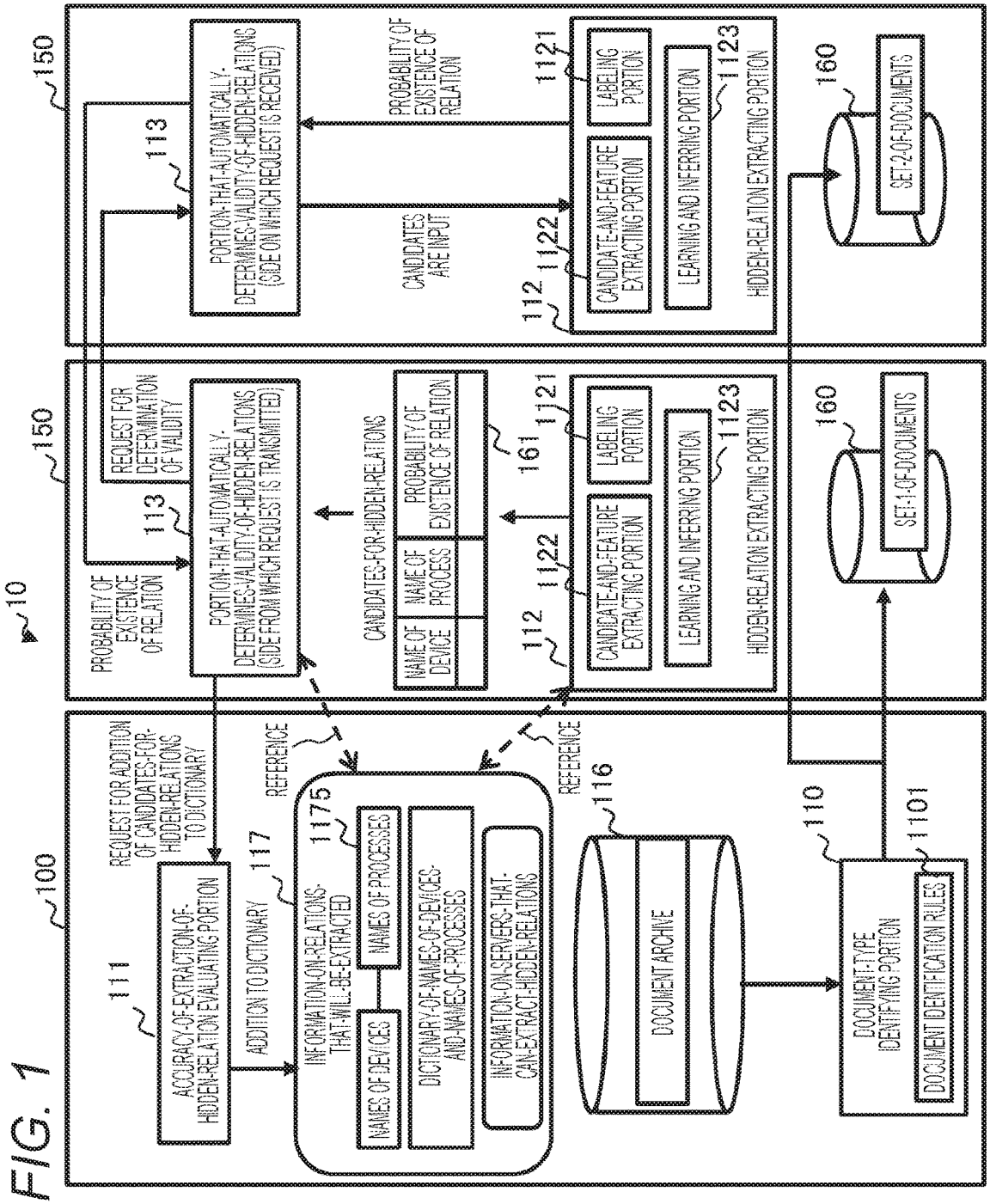
FIG. 1 is a diagram that illustrates an example of configurations of a word extraction assistance system according to a present preferred embodiment.

A preferred embodiment of the present invention will be described in detail below with reference to the accompanying drawings. FIG. 1 is a diagram that illustrates an example of configurations of a word extraction assistance system 10 according to a present preferred embodiment. The word extraction assistance system 10 illustrated in FIG. 1 is a computer system that efficiently and accurately extracts synonyms and related words.

The illustrated word extraction assistance system 10 includes a management server 100, and a plurality of structured-data generating servers 150. For a brief description, FIG. 1 exemplifies only two structured-data generating servers 150. However, the number of the structured-data generating servers 150 is not particularly limited if the number is equal to or larger than two.

The management server 100 is operated by an enterprise that runs word extraction business or a department in charge of word extraction business, for example. The management server 100 stores a document archive 116 that contains a plurality of documents from which words are extracted, and information-on-relations-that-will-be-extracted 117 that is structured data.

The management server 100 also includes, as functions of the management server 100, a document-type identifying portion 110, and an accuracy-of-extraction-of-hidden-relation evaluating portion 111.

The document-type identifying portion 110 classifies documents of the document archive 116 according to document identification rules 1101 (that will be described in detail later) defined by a domain expert, for example, generates a plurality of sets-of-documents 160, and transmits the plurality of sets-of-documents 160 to the structured-data generating servers 150.

The transmitted sets-of-documents 160 are documents that each contain words that each contain attributes 1175 (e.g. names of devices and names of processes) selected by a domain expert, for example.

The accuracy-of-extraction-of-hidden-relation evaluating portion 111 receives a result of a process of the portion-that-automatically-determines-validity-of-hidden-relations 113 of each of the structured-data generating servers 150, and adds corresponding candidates-for-structured-data to a dictionary of the information-on-relations-that-will-be-extracted 117, that is to say a dictionary-of-names-of-devices-and-names-of-processes 1171.

On the other hand, each of the structured-data generating servers 150 includes a hidden-relation extracting portion 112, and the portion-that-automatically-determines-validity-of-hidden-relations 113.

The hidden-relation extracting portion 112 performs a morphological analysis of the set-of-documents 160 that has been transmitted from the document-type identifying portion 110 of the management server 100, and thus extracts a group of words. Then the hidden-relation extracting portion 112 compares the group of words with the dictionary-of-names-of-devices-and-names-of-processes 1171 and the synonym dictionary 1172 of the information-on-relations-that-will-be-extracted 117, and thus generates candidatesfor-hidden-relations 161, that is to say candidates-for-structured-data (hereinafter, referred to as candidates-for-hidden-relations).

The hidden-relation extracting portion 112 includes a labeling portion 1121, a candidate-and-feature extracting portion 1122, and a learning and inferring portion 1123.

The above labeling portion 1121 performs a morphological analysis of the set-of-documents 160, and thus extracts a group of words. Then the labeling portion 1121 compares the group of words with the dictionary-of-names-of-devices-and-names-of-processes 1171 and the synonym dictionary 1172 of the information-on-relations-that-will-be-extracted 117. Consequently, the labeling portion 1121 assigns a label to each of the words contained in the set-of-documents 160.

For example, fault reports related to a railroad system are transmitted as a set-of-documents 160 from the document-type identifying portion 110. In this case, a morphological analysis is used to obtain words from the set-of-documents 160. The obtained words are compared with the above dictionaries 1171, 1172. Consequently, values of attributes, such as a name of a device at which a fault has occurred, a name of a process, a date and a time, and a name of a title, are determined as labels. Naturally, the form is just an example, and various forms are appropriately conceivable based on types of documents stored in the document archive 116.

From the words the above labeling portion 1121 has obtained, the candidate-and-feature extracting portion 1122 extracts sets of words whose values of attributes meet attributes selected by a user (attributes 1175 contained in the information-on-relations-that-will-be-extracted 117, e.g. sets of names of devices and names of processes). The sets of words become the candidates-for-structured-data. The candidate-and-feature extracting portion 1122 uses a predetermined algorithm to extract features from the sets of words.

The algorithm used to extract features is similar to an algorithm used in the above basic technique. Conceivable features may be a keyword between a word 1 and a word 2, and a distance between the keyword and the word 1, and a distance between the keyword and the word 2, for example. However, types of the features are not limited to the conceivable features.

Based on the above process of the candidate-and-feature extracting portion 1122, the learning and inferring portion 1123 learns a model that allows labels to be inferred from features of each of the sets of words in a set-of-documents 160. The labels relate to validity of the sets of words, that is to say the candidates-for-structured-data. Consequently, the learning and inferring portion 1123 calculates a probability of existence of a relation of each of the candidates-for-hidden-relations 161. The function of the learning and inferring portion 1123 is similar to a function in the above basic technique.

Further, the portion-that-automatically-determines-validity-of-hidden-relations 113 communicates with other structured-data generating servers 150 to inquire validity of one or some of the candidates-for-hidden-relations 161, a probability/probabilities (certainty) of existence of relation(s) of which is/are equal to or lower than a predetermined level, generated by the above hidden-relation extracting portion 112, and determines the validity.

—Hardware Configuration—

Figure 2:
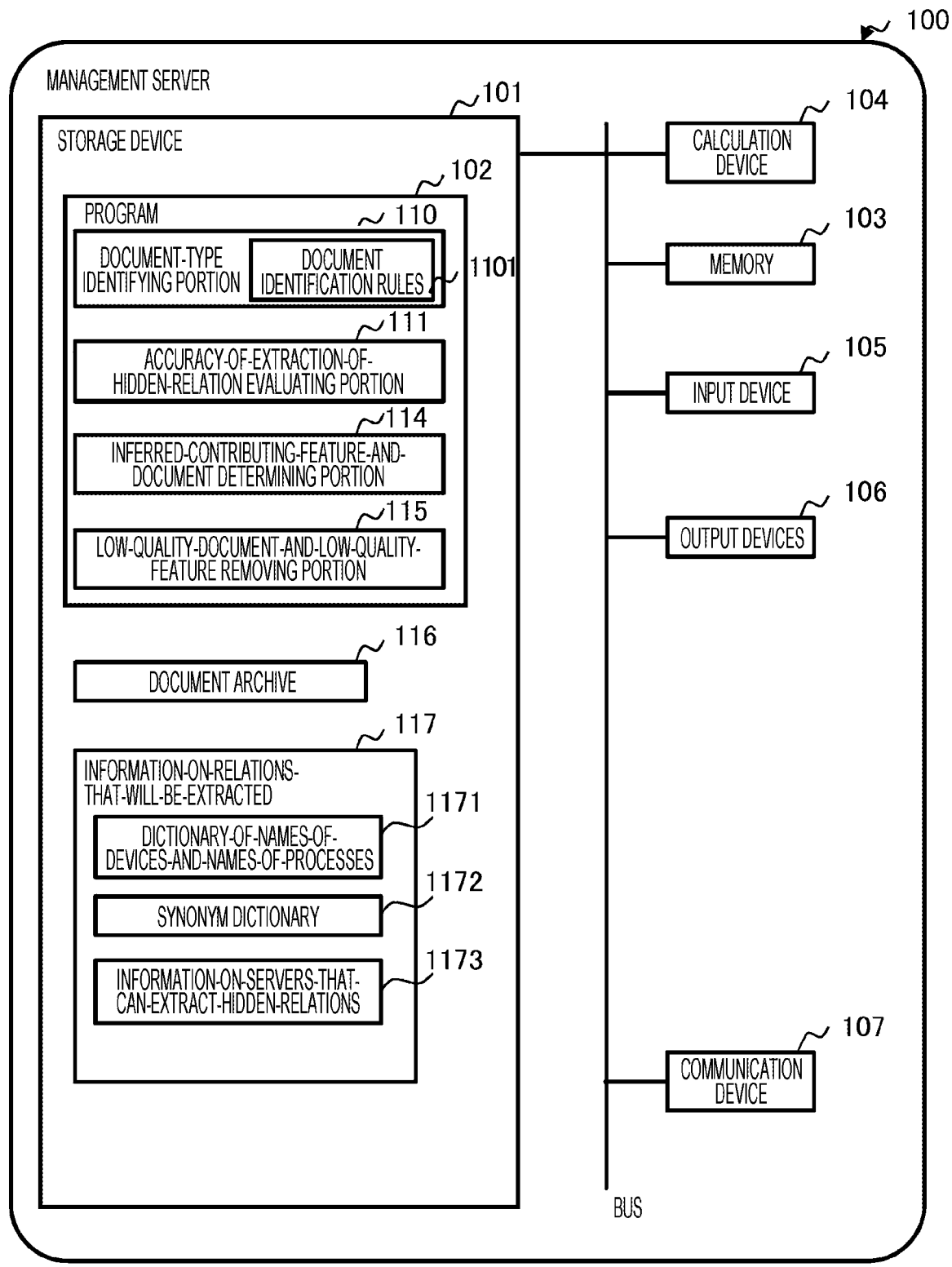
FIG. 2 is a diagram that illustrates an example of configurations of a management server according to the present preferred embodiment.

FIG. 2 illustrates a hardware configuration of the management server 100 of the word extraction assistance system 10. That is, the management server 100 includes a storage device 101, memory 103, a calculation device 104, an input device 105, output devices 106, and a communication device 107.

The storage device 101 includes an appropriate non-volatile storage device, such as a solid state drive (SSD), or a hard disk drive.

The memory 103 includes a volatile storage device, such as random access memory (RAM).

The calculation device 104 is a central processing unit (CPU) that reads program 102 stored in the storage device 101 into the memory 103 to allow the program 102 to run. Consequently, the calculation device 104 collectively controls the calculation device 104, and performs various determinations, calculations, and control.

The input device 105 is a keyboard in which a user keys, a mouse, or a microphone that receives voice commands.

The output devices 106 are a display that displays data processed by the calculation device 104, a speaker, or the like.

The communication device 107 is a network interface card that allows the management server 100 to communicate with the structured-data generating servers 150 through an appropriate network.

In addition to the program 102 for implementation of necessary functions of the management server 100 of the word extraction assistance system 10 according to the present preferred embodiment, the storage device 101 stores at least the document archive 116 and the information-on-relations-that-will-be-extracted 117.

Figure 3:
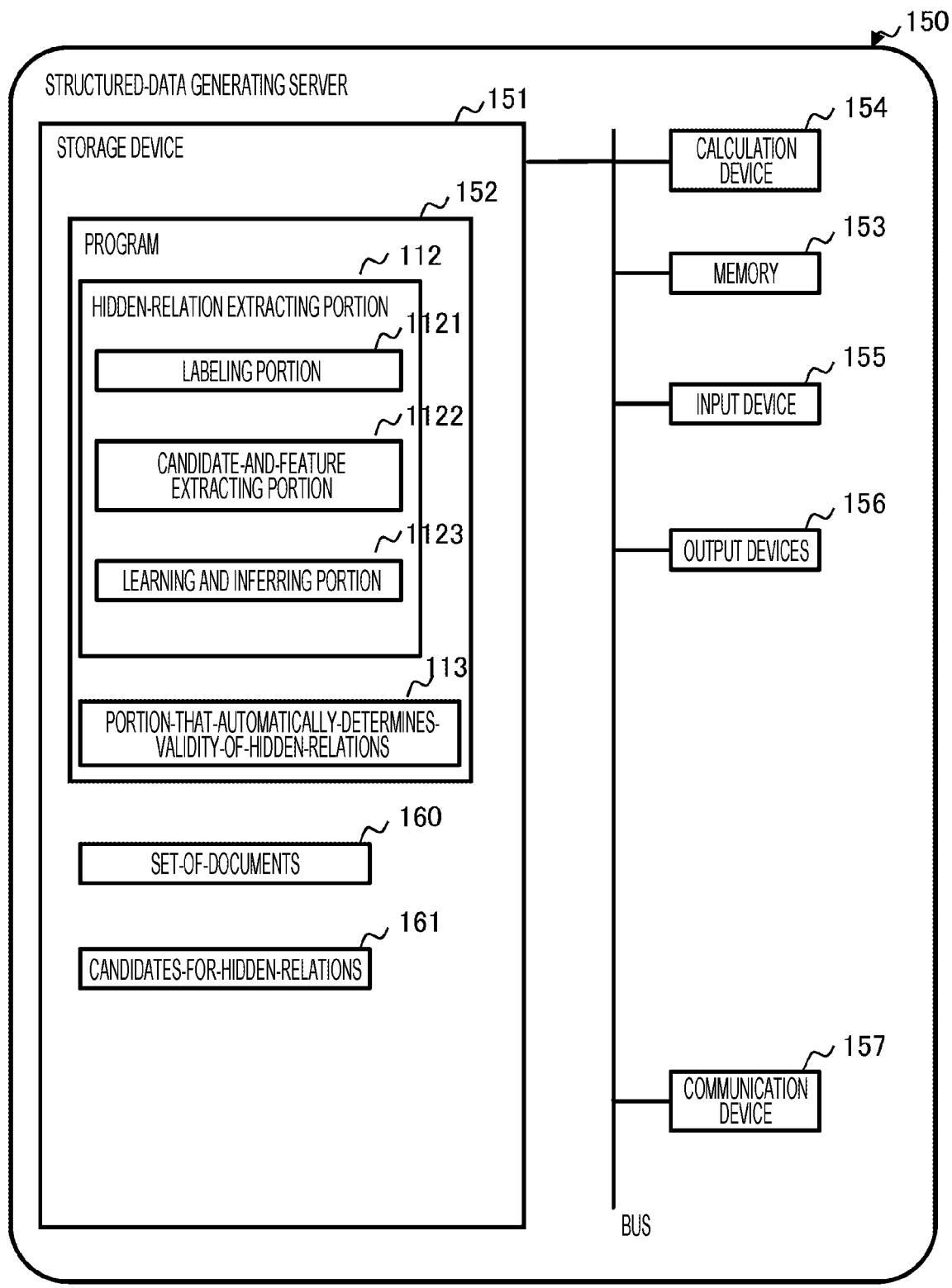
FIG. 3 is a diagram that illustrates an example of configurations of a structured-data generating server according to the present preferred embodiment.

FIG. 3 illustrates an example of hardware configurations of one of the structured-data generating servers 150. The structured-data generating server 150 according to the present preferred embodiment includes a storage device 151, memory 153, a calculation device 154, an input device 155, output devices 156, and a communication device 157.

The storage device 151 includes an appropriate non-volatile storage device, such as a solid state drive (SSD), or a hard disk drive.

The memory 153 includes a volatile storage device, such as RAM.

The calculation device 154 is a CPU that reads program 152 stored in the storage device 151 into the memory 153 to allow the program 152 to run. Consequently, the calculation device 154 collectively controls the calculation device 154, and performs various determinations, calculations, and control.

The input device 155 is a keyboard in which a user keys, a mouse, or a microphone that receives voice commands.

The output devices 156 are a display that displays data processed by the calculation device 154, a speaker, or the like.

The communication device 157 is a network interface card that allows the structured-data generating server 150 to communicate with the above management server 100 and other structured-data generating servers 150 through an appropriate network.

In addition to the program 152 for implementation of necessary functions of the structured-data generating server of the word extraction assistance system 10 according to the present preferred embodiment, the storage device 151 stores at least a set-of-documents 160 and candidates-for-hidden-relations 161.

Example of Data Structure

Next, information used by the management server 100 and the structured-data generating servers 150 of the word extraction assistance system 10 according to the present preferred embodiment will be described.

FIG. 4 illustrates an example of the information-on-relations-that-will-be-extracted 117 according to the present preferred embodiment. For example, the information-on-relations-that-will-be-extracted 117 is a collection of data, such as sets of words that have been selected by a domain expert and will be extracted, that is to say types-of-hidden-relations-that-will-be-extracted (e.g. names of devices and names of processes) 1174, a dictionary-of-names-of-devices-and-names-of-processes 1171, information-on-servers-that-can-extract-hidden-relations 1173, and a synonym dictionary 1172.

Suppose that the dictionary-of-names-of-devices-and-names-of-processes 1171 contains a dictionary of keywords 1 "names of devices" and a dictionary of keywords 2 "names of processes" that have been selected as the types-of-hidden-relations-that-will-be-extracted. Further, suppose that the dictionary-of-names-of-devices-and-names-of-processes 1171 contains a relation dictionary that assigns a value of probability to a combination of each word of the keywords 1 and each word of the keywords 2.

FIG. 4 exemplifies the dictionary-of-names-of-devices-and-names-of-processes 1171 to clearly illustrate the "names of devices and names of processes" selected as the types-of-hidden-relations-that-will-be-extracted 1174 and the dictionaries that correspond to the "names of devices and names of processes". Therefore, if other sets of words are selected as the types-of-hidden-relations-that-will-be-extracted 1174, dictionaries that correspond to the other sets of words are used.

If a probability of existence of a combination of words is high, the relation dictionary assigns a value "true (t)" to the combination of words. Alternatively, if a probability of existence of a combination of words is not high, the relation dictionary assigns a value "false (f)" to the combination of words.

The information-on-servers-that-can-extract-hidden-relations 1173 includes information on Internet Protocol (IP) addresses of the structured-data generating servers 150.

The synonym dictionary 1172 defines synonyms of words contained in the above dictionary-of-names-of-devices-and-names-of-processes 1171. The synonym dictionary 1172 is a collection of records that are pairs of each word contained in the dictionary-of-names-of-devices-and-names-of-processes 1171 and a synonym of the word. In an example in FIG. 4, the names of devices and synonyms of names of devices that are defined, and the names of processes and synonyms of names of processes that are defined are illustrated.

Next, FIG. 5 illustrates examples of candidates-for-hidden-relations 161 according to the present preferred embodiment. The candidates-for-hidden-relations 161 are candidates-for-structured-data generated by the hidden-relation extracting portion 112. Each of the candidates-for-hidden-relations 161 is data in which a set of words is related to a value of a probability of existence of a relation between the set of words.

FIG. 5 exemplifies values of probabilities of existence of relations between the keywords 1 (e.g. yesterday) that are words and the keywords 2 (e.g. traffic information display (TID)) that are other words. The values of probabilities of existence of relations range from zero to one inclusive. If a value of a probability of existence of a relation is "one", there is a high probability of existence of a relation between a set of words that constitute candidate-for-structured-data. If a value of a probability of existence of a relation is "zero", there is not a high probability of existence of a relation between a set of words that constitute candidate-for-structured-data (in other words, there is hardly a relation). On the other hand, a value between "zero" and "one", such as "0.02", means that there is an unclear relation between a corresponding set of words.

Next, FIG. 6 illustrates examples of document identification rules 1101 according to the present preferred embodiment. The document identification rules 1101 are information of the document-type identifying portion 110. According to the document identification rules 1101, documents that have attributes selected by a domain expert, for example, are extracted from the document archive 116.

In an example in FIG. 6, a combination of a keyword and a section of a document where the keyword appears is defined as the above attribute. Values, such as a "beginning of a front page", a "header", and "within first one-hundred words" are defined as the sections of a document. Values, such as a "function specification", a "fault report", and a "title: [fault report]" are defined as "keywords" that appear in the section of a document.

The document-type identifying portion 110 applies the document identification rules 1101 to each document of the document archive 116, and extracts, from the document archive 116, a plurality of documents that meet the document identification rules 1101.

Flowchart Example (Extraction of Sets of Documents from Document Archive and Transmission of Sets of Documents)

Hereinafter, actual steps of a word extraction assistance method according to the present preferred embodiment will be described with reference to the drawings. To perform various operations that correspond to the word extraction assistance method that will be described later, the management server 100 or the structured-data generating servers 150 of the word extraction assistance system 10 read program into memory of the management server 100 or the structured-data generating servers 150, and execute the program. The program performs the various operations. The program includes code that allows various operations that will be described later to be performed.

Figure 7:
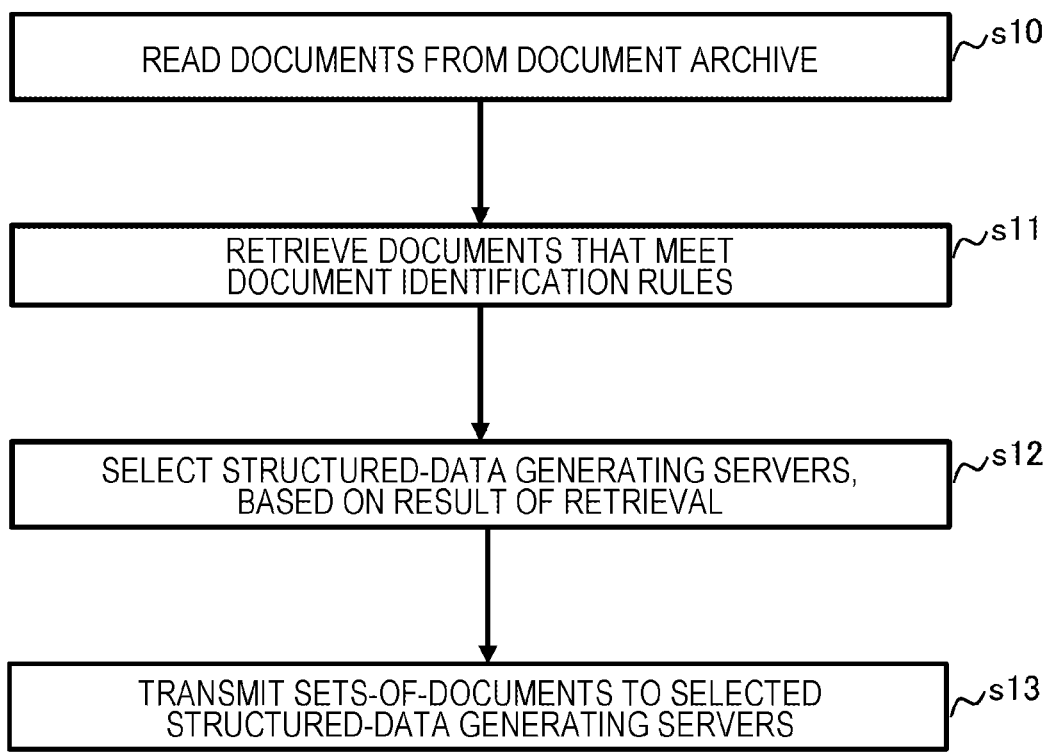
FIG. 7 is a flowchart that illustrates a flowchart example 1 of a word extraction assistance method according to the present preferred embodiment.

FIG. 7 is a flowchart that illustrates a flowchart example 1 of a word extraction assistance method according to the present preferred embodiment. Hereinafter, first, a flowchart of the hidden-relation extracting portion 112 of one of the structured-data generating servers 150 will be described.

In that case, the hidden-relation extracting portion 112 reads documents from the document archive 116 (s10). The hidden-relation extracting portion 112 retrieves documents that meet the document identification rules 1101 (s11). The document identification rules 1101 have been described with reference to FIG. 6.

Next, based on a result of the retrieval in above s11, the hidden-relation extracting portion 112 determines a plurality of groups of documents that meet the document identification rules 1101. The groups of documents are sets-of-documents 160. The hidden-relation extracting portion 112 selects structured-data generating servers 150 to which the sets-of-documents 160 will be transmitted (s12). Preferably, the sets-of-documents 160 have respective different attributes (e.g. file types, and data formats), and will be transmitted to the respective structured-data generating servers 150.

The hidden-relation extracting portion 112 transmits the sets-of-documents 160 to the respective structured-data generating servers 150 that have been selected in above s12 (s13), and ends the process.

Figure 8:
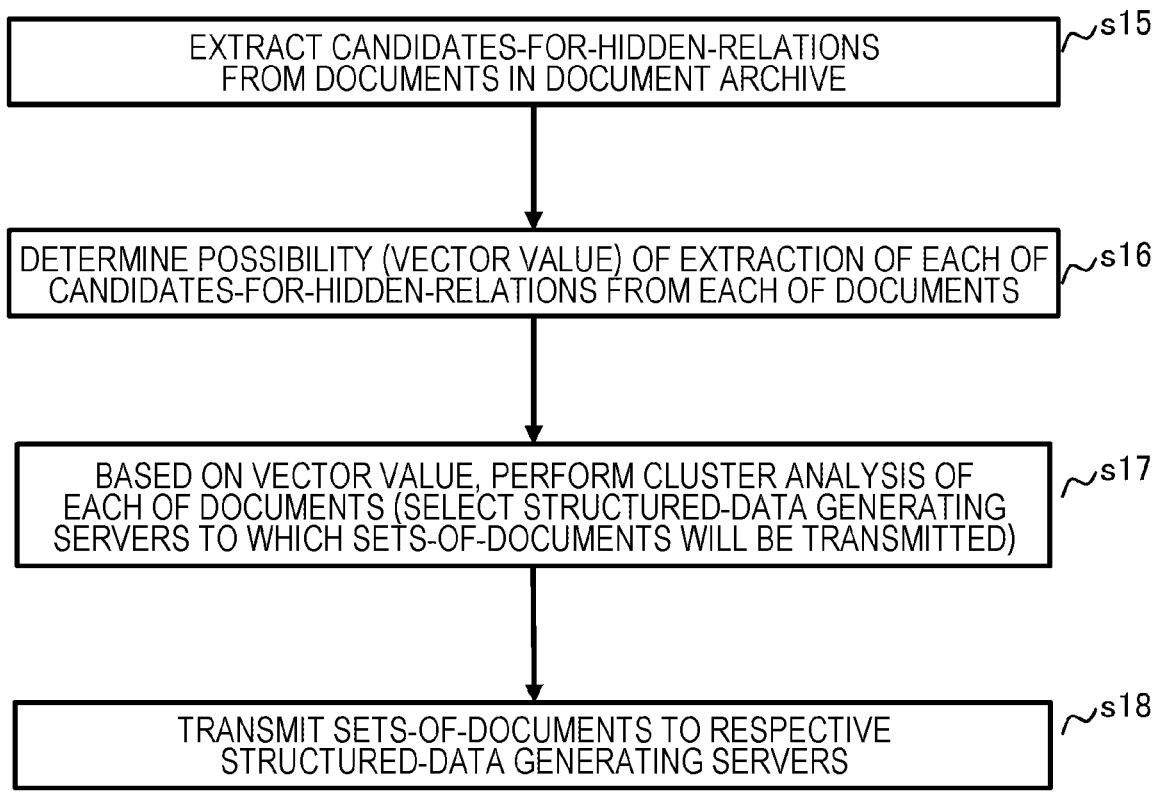
FIG. 8 is a flowchart that illustrates a flowchart example 2 of a word extraction assistance method according to the present preferred embodiment.

Alternatively, structured-data generating servers 150 to which sets-of-documents 160 will be transmitted may be selected in a way that is different from a way in the above example. FIG. 8 illustrates a flowchart example 2 of a word extraction assistance method according to the present preferred embodiment.

In that case, the hidden-relation extracting portion 112 of one of the structured-data generating servers 150 performs a morphological analysis of each of documents of the document archive 116. Based on a result of the morphological analysis, and the dictionary-of-names-of-devices-and-names-of-processes 1171 and the synonym dictionary 1172 of the information-on-relations-that-will-be-extracted 117, the hidden-relation extracting portion 112 extracts candidates-for-hidden-relations (s15).

Based on the result of the above morphological analysis, and the dictionary-of-names-of-devices-and-names-of-processes 1171, and the synonym dictionary 1172, the hidden-relation extracting portion 112 calculates a probability of existence of a relation of each of the candidates-for-hidden-relations that have been obtained in s15. Based on the calculation of the probability, the hidden-relation extracting portion 112 determines a possibility of extraction of each of the candidates-for-hidden-relations from each of the documents, that is to say easiness (a probability) of extraction (s16).

The easiness of extraction may be, for example, a vector value composed of a probability of existence of a candidate-for-hidden-relation in a document, that is to say a probability of existence of a set of words in a document, and a probability of existence of a relation of the candidate-for-hidden-relation.

Next, based on the vector values determined in s16, the hidden-relation extracting portion 112 performs a cluster analysis of each of the documents. Consequently, the hidden-relation extracting portion 112 selects where the sets-of-documents 160 that haven been analyzed using the cluster analysis will be transmitted. That is to say, the hidden-relation extracting portion 112 selects the structured-data generating servers 150 to which the sets-of-documents 160 that have been analyzed using the cluster analysis will be transmitted (s17).

In the above cluster analysis, the documents are classified, and thus the sets-of-documents 160 are grouped. Consequently, the above vector values of the structured-data generating servers 150 are different from each other.

The hidden-relation extracting portion 112 transmits the sets-of-documents 160 to the respective structured-data generating servers 150 that have been selected in above s17 (s18), and ends the process.

Flowchart Example (Extraction of Hidden Relations and Automatic Determination of Validity of Hidden Relations)

Figure 9:
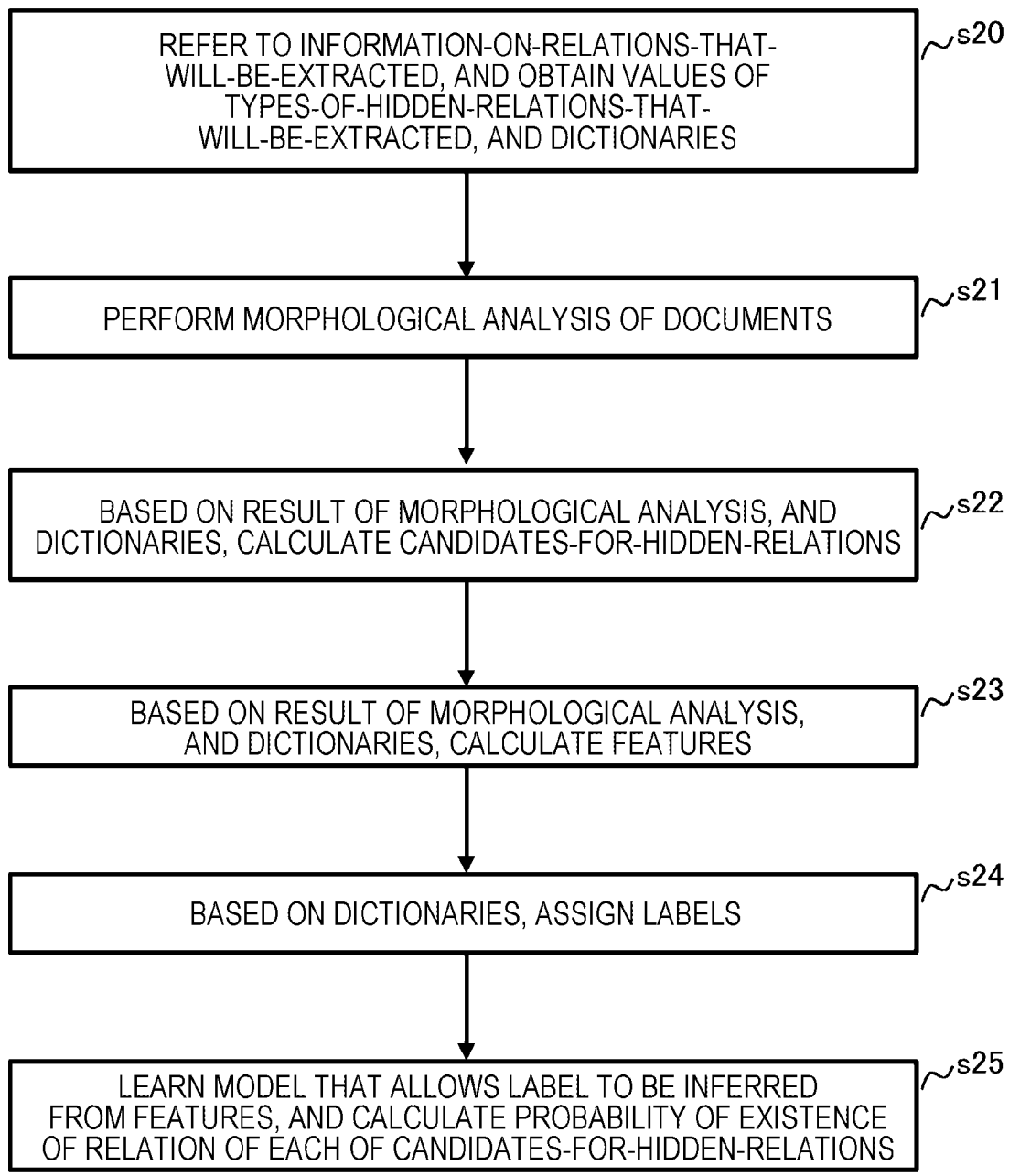
FIG. 9 is a flowchart that illustrates a flowchart example 3 of a word extraction assistance method according to the present preferred embodiment.
Figure 12:
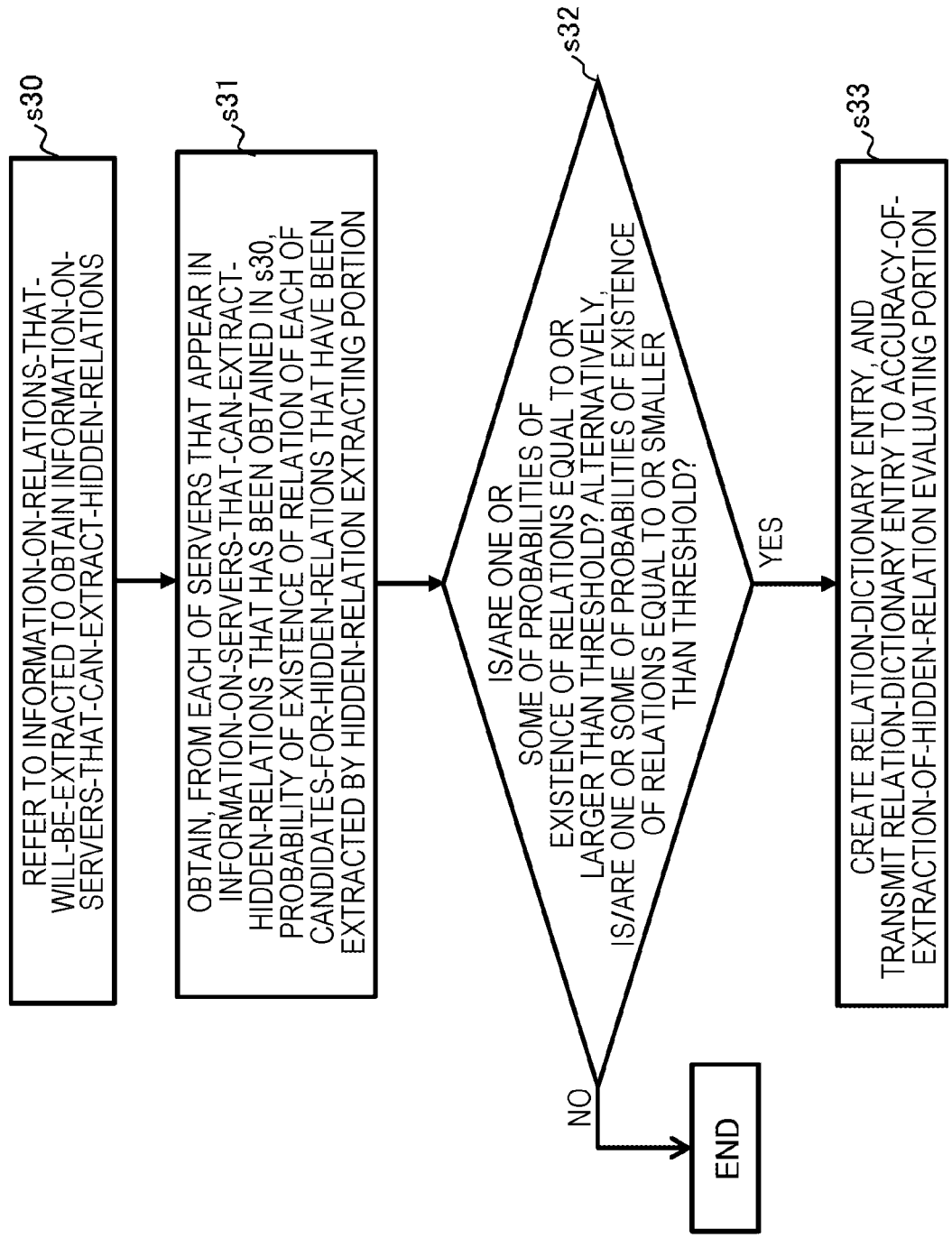
FIG. 12 is a flowchart that illustrates a flowchart example 4 of a word extraction assistance method according to the present preferred embodiment.
Figure 13:
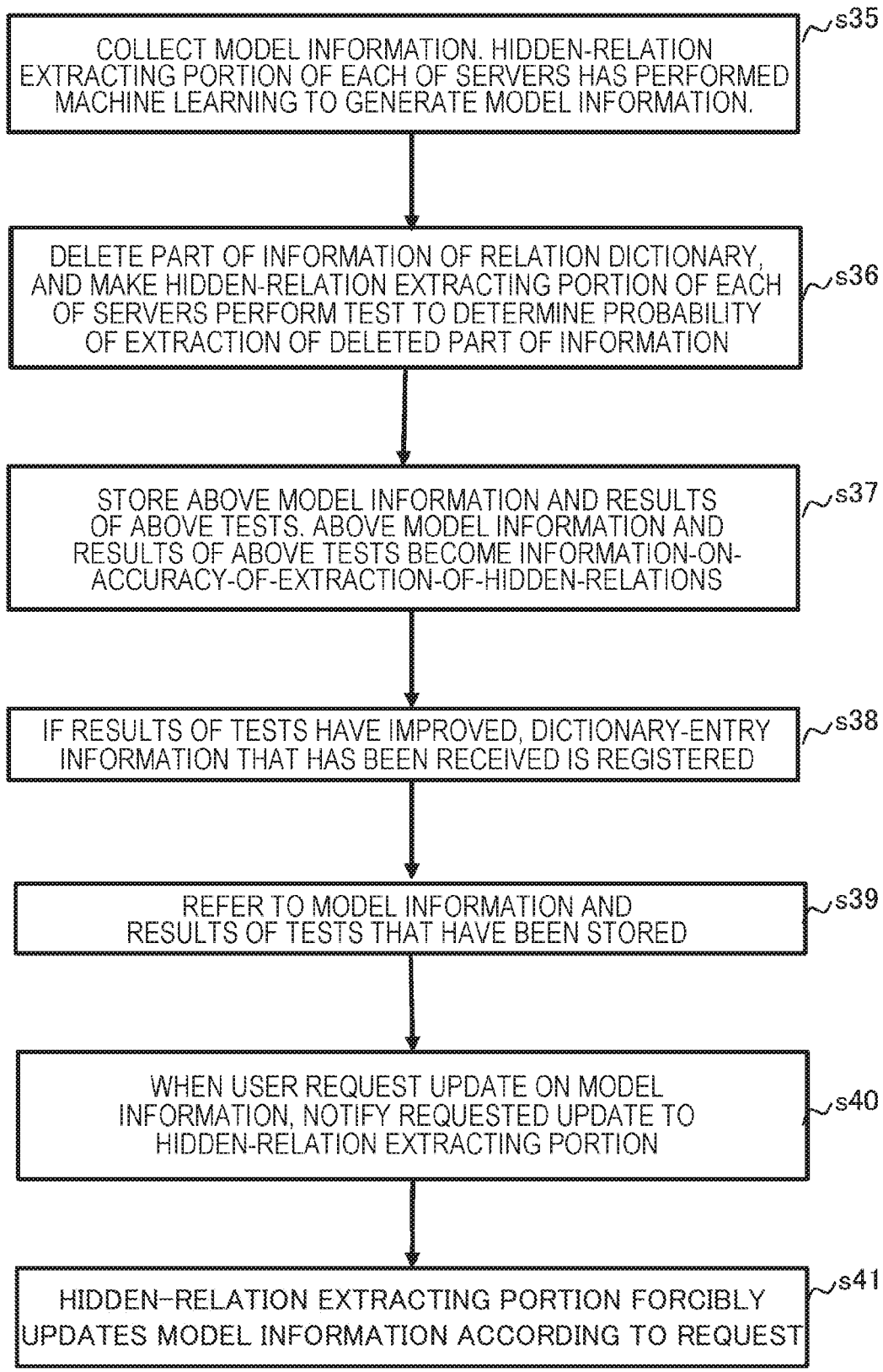
FIG. 13 is a flowchart that illustrates a flowchart example 5 of a word extraction assistance method according to the present preferred embodiment.

Next, steps of extraction of hidden relations and steps of automatic determination of validity of hidden relations will be described. FIG. 9 illustrates a flowchart example 3 of a word extraction assistance method according to the present preferred embodiment.

In that case, the hidden-relation extracting portion 112 refers to the information-on-relations-that-will-be-extracted 117, and obtains values of types-of-hidden-relations-that-will-be-extracted as sets of words that will be extracted, and the dictionary-of-names-of-devices-and-names-of-processes 1171, and the synonym dictionary 1172 (s20).

Further, the hidden-relation extracting portion 112 performs a morphological analysis of each of documents of a set-of-documents 160 the hidden-relation extracting portion 112 receives from the document-type identifying portion 110 of the management server 100 (s21).

FIG. 10 illustrates an example of a result of the morphological analysis. In a result-of-the-morphological-analysis 900 illustrated in FIG. 10, identifications (IDs) of documents contained in the set-of-documents 160 and IDs of sentences contained in the documents are used as keys. The keys are related to respective words, lemmas, and part of speech that have been obtained from the documents.

Next, based on the result-of-the-morphological-analysis 900 that has been obtained in above s21, and the dictionary-of-names-of-devices-and-names-of-processes 1171 and the synonym dictionary 1172 that have been obtained in s20, the hidden-relation extracting portion 112 calculates candidates-for-hidden-relations 161 (s22).

Further, based on the above result-of-the-morphological-analysis 900, and the dictionary-of-names-of-devices-and-names-of-processes 1171 and the synonym dictionary 1172, the hidden-relation extracting portion 112 calculates features of the candidates-for-hidden-relations 161 that have been obtained in above s22 (s23).

FIG. 11 illustrates specific examples of the candidates-for-hidden-relations 161 and the features of the candidates-for-hidden-relations 161 that have been obtained above. FIG. 11 exemplifies the candidates-for-hidden-relations 161 that are sets of words of the "names of devices and names of processes". For each of the sets of words, values, such as features of the set of words, a label of the set of words, and a probability of existence of a relation of the set of words are defined.

One of the features "WORD_IN_BETWEEN" is a word (or a mark) between a keyword 1 and a keyword 2.

As to one of the features "KW1_in_dict", "f" signifies that the dictionary-of-names-of-devices-and-names-of-processes 1171 does not contain a keyword 1, and "t" signifies that the dictionary-of-names-of-devices-and-names-of-processes 1171 contains a keyword 1. As to one of the features "KW2_in_dict", "f" signifies that the dictionary-of-names-of-devices-and-names-of-processes 1171 does not contain a keyword 2, and "t" signifies that the dictionary-of-names-of-devices-and-names-of-processes 1171 contains a keyword 2.

A label is assigned in s24. For example, based on the dictionary-of-names-of-devices-and-names-of-processes 1171 and the synonym dictionary 1172, it is determined whether or not the dictionary-of-names-of-devices-and-names-of-processes 1171 defines a set of words of each of the candidates-for-hidden-relations 161 or synonyms of the set of words. Based on the determination, the label is determined and assigned. If a set of words or synonyms of the set of words are not defined, "f" is assigned. If a set of words or synonyms of the set of words are defined, "t" is assigned. If one of a set of words or one of synonyms of the set of words is defined, or if a set of words or synonyms of the set of words are not clearly defined, "nil" is assigned. Alternatively, a label may be assigned based on a value of a probability of existence of a relation. If a value of a probability of existence of a relation is "zero", "f" may be assigned. Alternatively, if a value of a probability of existence of a relation is "one", "t" may be assigned. Alternatively, if a value of a probability of existence of a relation is between "zero" and "one", "nil" may be assigned, for example.

Next, the hidden-relation extracting portion 112 compares the above sets of words of the candidates-for-hidden-relations 161 with the dictionary-of-names-of-devices-and-names-of-processes 1171 and the synonym dictionary 1172. Based on whether or not the dictionary-of-names-of-devices-and-names-of-processes 1171 defines each of the sets of words or synonyms of each of the sets of words, the hidden-relation extracting portion 112 determines a label for each of the sets of words, and assigns a label to each of the sets of words (s24).

Further, the hidden-relation extracting portion 112 uses predetermined machine-learning algorithms to learn a model that allows a label to be inferred from features of each of the candidates-for-hidden-relations 161 (s25). Further, the hidden-relation extracting portion 112 calculates a probability of existence of a relation of each of the candidates-for-hidden-relations 161 (s25). The above basic techniques may be appropriately applied to assign the label, and to calculate the value of a probability of existence of a relation.

On the other hand, a portion-that-automatically-determines-validity-of-hidden-relations 113 of the above structured-data generating server 150 refers to the information-on-relations-that-will-be-extracted 117 to obtain information-on-servers-that-can-extract-hidden-relations (s30).

The portion-that-automatically-determines-validity-of-hidden-relations 113 obtains, from each of servers that appear in the information-on-servers-that-can-extract-hidden-relations that has been obtained in s30, that is to say other structured-data generating servers 150, a value of a probability of existence of a relation of each of the candidates-for-hidden-relations (s31). The candidates-for-hidden-relations have been extracted by the hidden-relation extracting portion 112 (that is an agent that performs the flowchart in FIG. 9) of the structured-data generating server 150 that includes the portion-that-automatically-determines-validity-of-hidden-relations 113.

Next, the portion-that-automatically-determines-validity-of-hidden-relations 113 compares a predetermined threshold (e.g. 0.6) with a value of a probability of existence of a relation of each of the candidates-for-hidden-relations that have been obtained in s31, and determines whether one or some of the probabilities of existence of relations is/are equal to or larger than the threshold, or is/are equal to or smaller than the threshold (s32).

As a result of the above determination, if the values of probabilities of existence of relations are not equal to or larger than the threshold, or not equal to or smaller than the threshold (N in s32), the portion-that-automatically-determines-validity-of-hidden-relations 113 ends the process.

Alternatively, as a result of the above determination, if one or some of the values of probabilities of existence of relations is/are equal to or larger than the threshold, or is equal to or smaller than the threshold (Y in s32), the portion-that-automatically-determines-validity-of-hidden-relations 113 creates a relation-dictionary entry for the corresponding candidate(s)-for-hidden-relation(s), transmits the relation-dictionary entry to the accuracy-of-extraction-of-hidden-relation evaluating portion 111 of the management server 100 (s33), and ends the process. In that case, the accuracy-of-extraction-of-hidden-relation evaluating portion 111 stores the relation-dictionary entry in the information-on-relations-that-will-be-extracted 117.

The accuracy-of-extraction-of-hidden-relation evaluating portion 111 collects model information stored in each of the structured-data generating servers 150 (s35). The model information has been obtained in s25 in FIG. 9. The hidden-relation extracting portion 112 has performed machine learning to generate the model information. An example of the model information is illustrated as weighting information 1300 in FIG. 14.

Next, the accuracy-of-extraction-of-hidden-relation evaluating portion 111 deletes part of information of predetermined items, for example, of the relation dictionary of the information-on-relations-that-will-be-extracted 117 (s36). Further, the accuracy-of-extraction-of-hidden-relation evaluating portion 111 makes the hidden-relation extracting portion 112 of each of the structured-data generating servers 150 perform a test to determine a probability of extraction of the deleted part of information (s36).

Further, the accuracy-of-extraction-of-hidden-relation evaluating portion 111 stores, in a predetermined area of the storage device 101, the model information obtained in s35 and the results of the tests in s36 (s37). The stored model information and results of the tests become information-on-accuracy-of-extraction-of-hidden-relations.

Next, if the results of the tests have improved, the accuracy-of-extraction-of-hidden-relation evaluating portion 111 registers, in the dictionary-of-names-of-devices-and-names-of-processes 1171 of the information-on-relations-that-will-be-extracted 117, the dictionary-entry information the accuracy-of-extraction-of-hidden-relation evaluating portion 111 has received from the portion-that-automatically-determines-validity-of-hidden-relations 113 in s33 (s38).

Further, the accuracy-of-extraction-of-hidden-relation evaluating portion 111 refers to the model information and the results of the tests that have been stored in s37 (s39).

Next, when a user requests update on the model information, the accuracy-of-extraction-of-hidden-relation evaluating portion 111 notifies the requested update to the hidden-relation extracting portion 112 (s40).

In that case, the hidden-relation extracting portion 112 forcibly updates the model information according to the request (s41), and ends the process.

Flowchart Example (Removal of Feature and Document)

Next, an example is described in which feature(s) and document(s) that contribute to wrong detection or valid detection of candidates-for-hidden-relations are analyzed using a predetermined algorithm. The wrong detection or valid detection of candidates-for-hidden-relations is validity or invalidity of the candidates-for-hidden-relations, that is to say candidates-for-structured-data, based on determination of validity. Feature(s) and document(s) whose evaluated qualities are low based on a result of the analysis are removed. The example is illustrated in FIG. 15.

Figure 15:
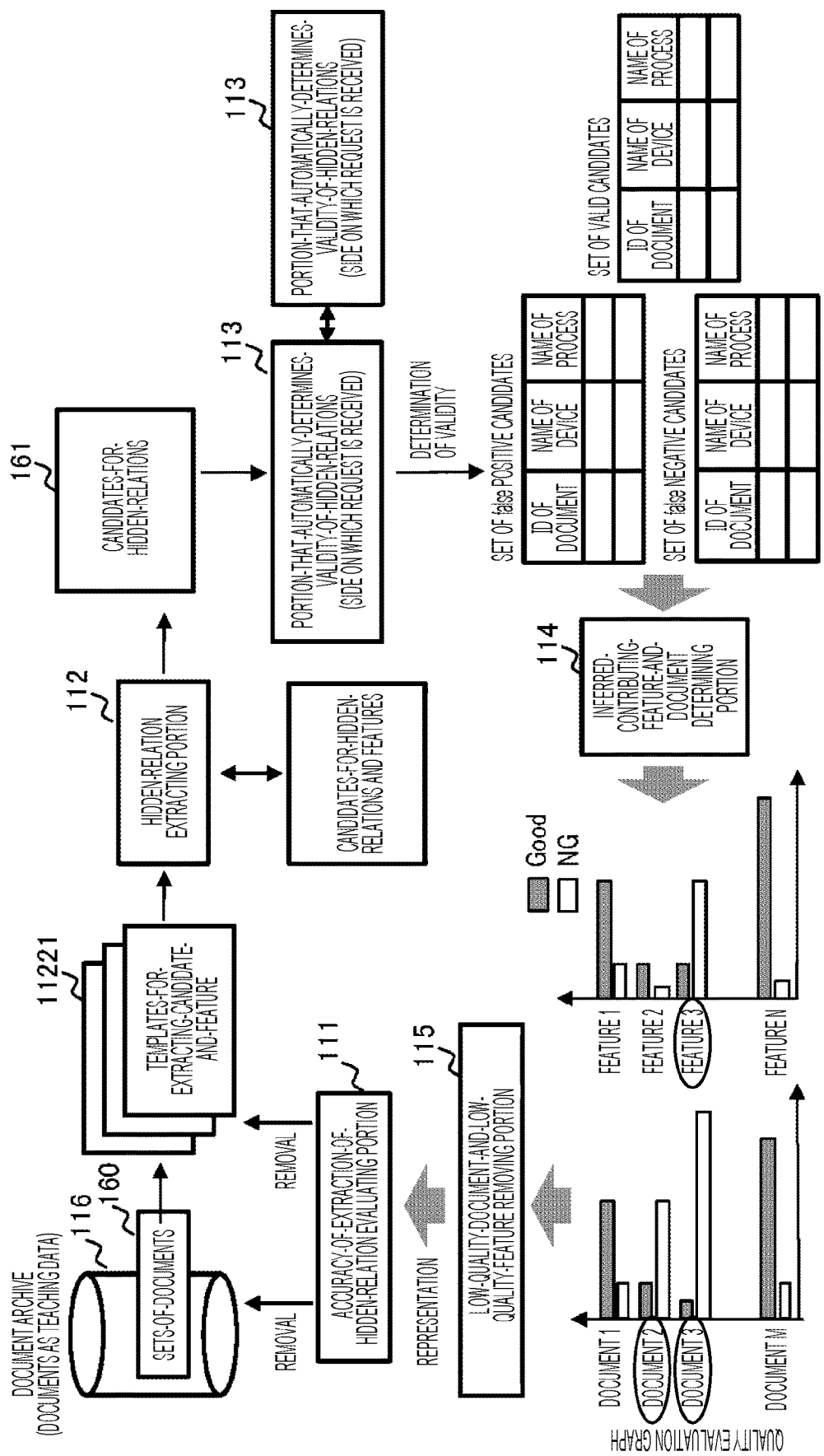
FIG. 15 is a diagram that illustrates an example 1 of a concept of extraction of words according to the present preferred embodiment.
Figure 16:
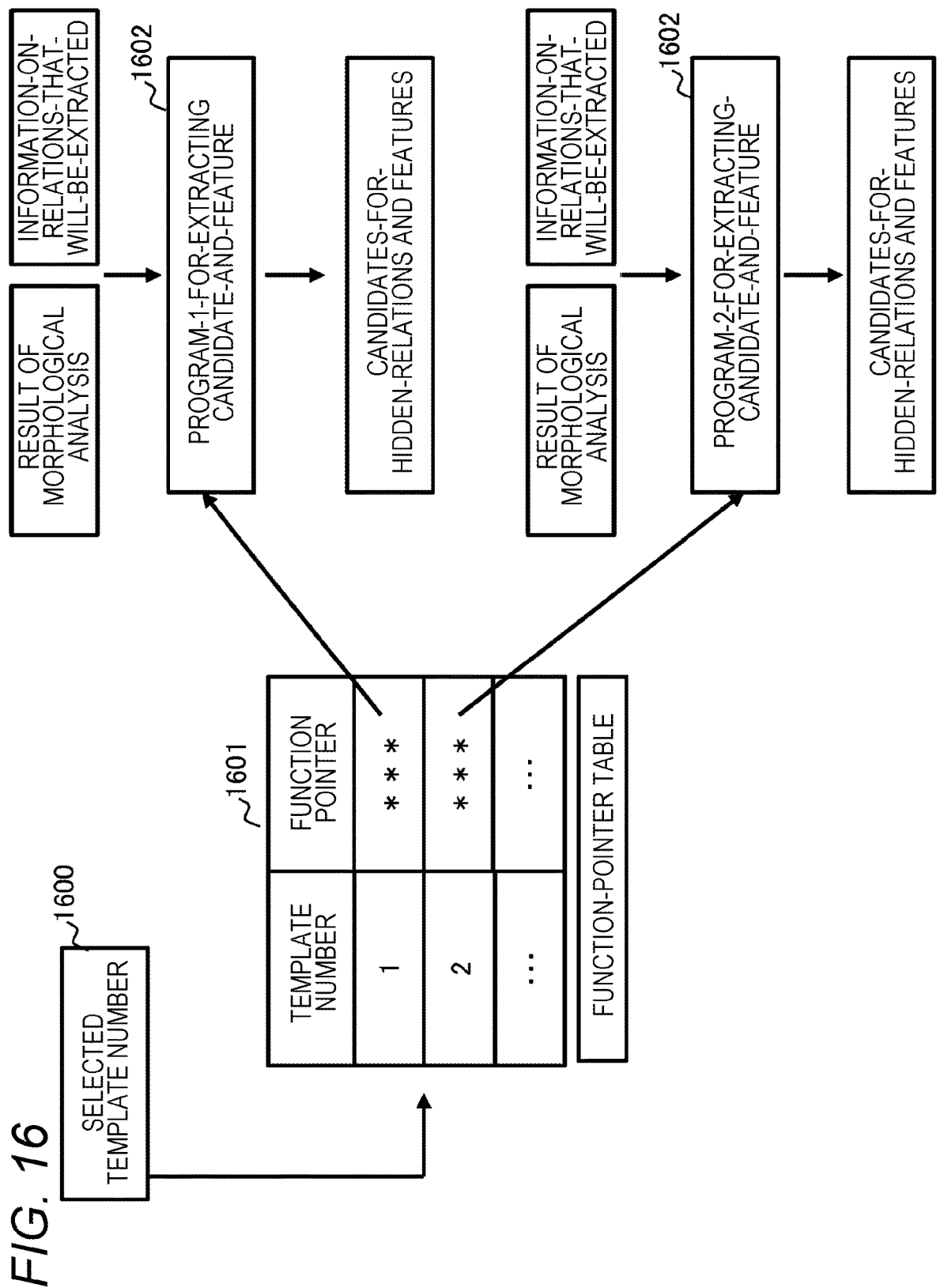
FIG. 16 is a diagram that illustrates an example 2 of a concept of extraction of words according to the present preferred embodiment.
Figure 17:
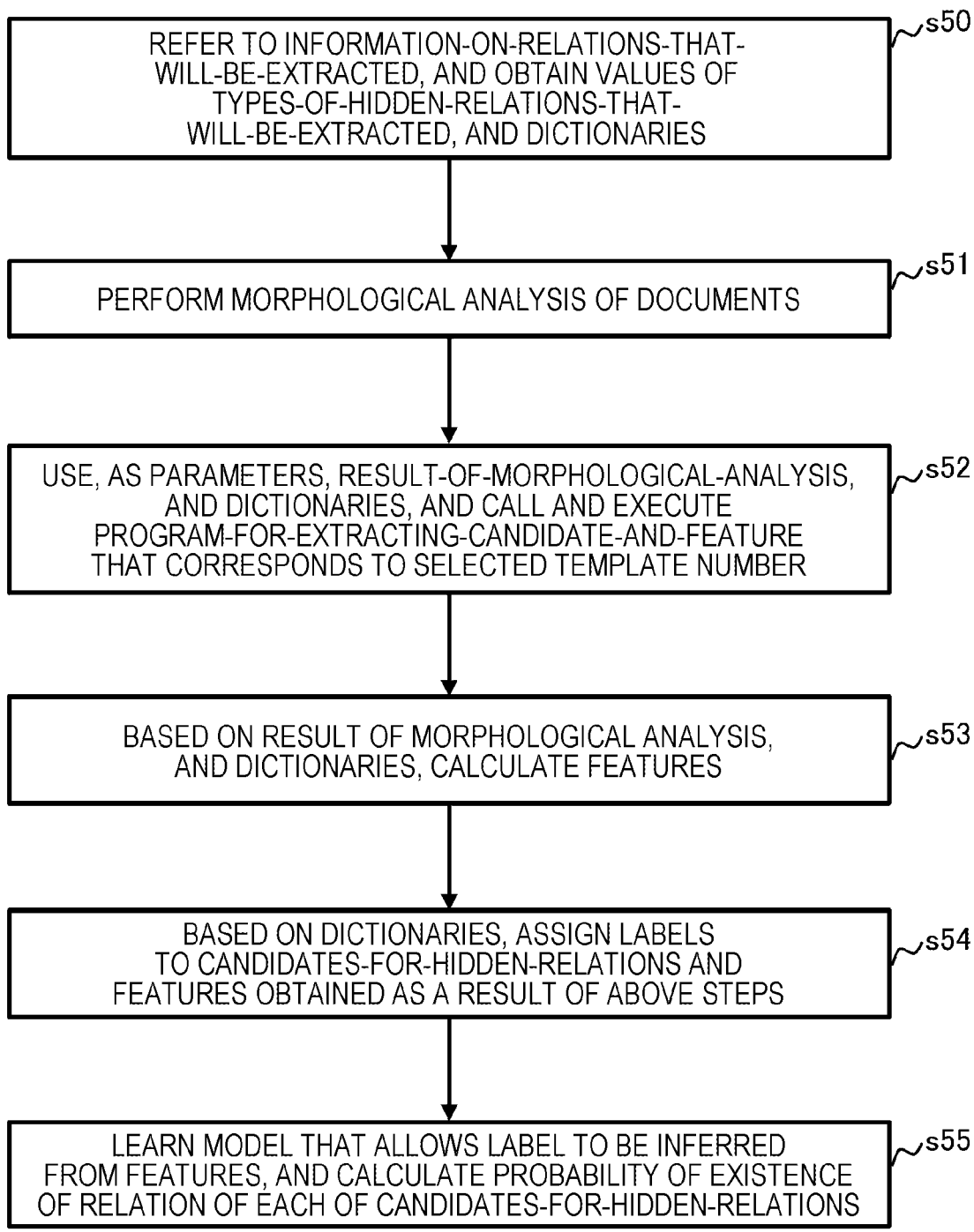
FIG. 17 is a flowchart that illustrates a flowchart example 6 of a word extraction assistance method according to the present preferred embodiment.
Figure 18:
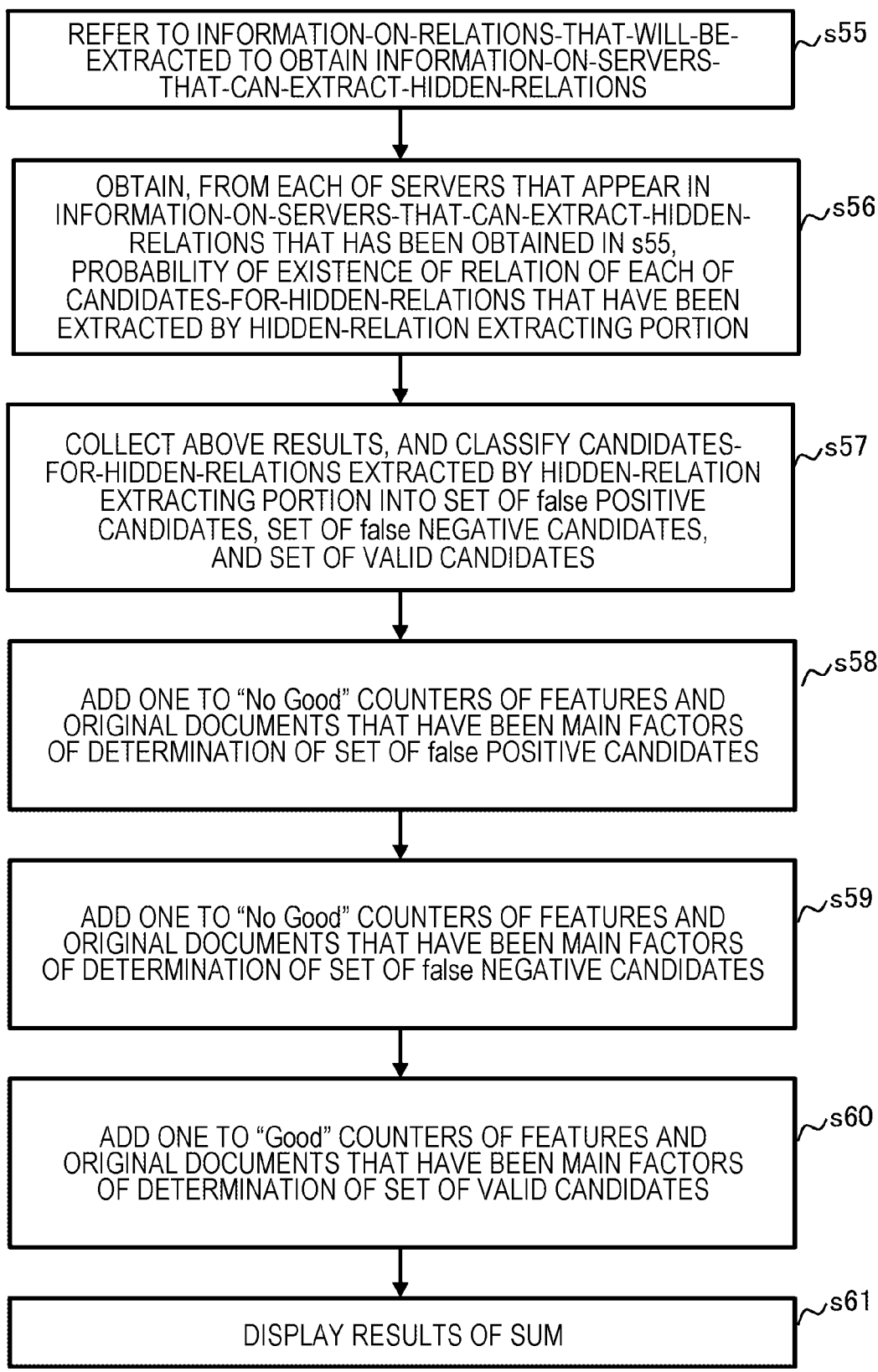
FIG. 18 is a flowchart that illustrates a flowchart example 7 of a word extraction assistance method according to the present preferred embodiment.

FIG. 15 is a diagram that illustrates an example 1 of a concept of extraction of words according to the present preferred embodiment. FIG. 16 is a diagram that illustrates an example 2 of a concept of extraction of words according to the present preferred embodiment.

In that case, at a time of creation of candidates-for-hidden-relations, a candidate-and-feature extracting portion 1122 of the hidden-relation extracting portion 112 refers to a function-pointer table 1601 to determine a function pointer that corresponds to one of templates-for-extracting-candidate-and-feature 11221, e.g. a template number 1600 selected by a domain expert. Further, the candidate-and-feature extracting portion 1122 calls and executes program-for-extracting-candidate-and-feature 1602 that corresponds to the function pointer. In that case, the program-for-extracting-candidate-and-feature 1602 is an entity of the candidate-and-feature extracting portion 1122.

For the above configuration, the candidate-and-feature extracting portion 1122 stores, in the storage device 151, the above function-pointer table 1601 and the program-for-extracting-candidate-and-feature 1602 that corresponds to function pointers listed in the function-pointer table 1601. Further, the candidate-and-feature extracting portion 1122 appropriately refers to the function-pointer table 1601, and calls the program-for-extracting-candidate-and-feature 1602.

Next, FIGS. 17 to 21 illustrate flowchart examples 6 to 8 of a word extraction assistance method according to the present preferred embodiment.

In that case, the hidden-relation extracting portion 112 refers to the information-on-relations-that-will-be-extracted 117, and obtains values of types-of-hidden-relations-that-will-be-extracted as sets of words that will be extracted, and the dictionary-of-names-of-devices-and-names-of-processes 1171, and the synonym dictionary 1172 (s50).

Further, the hidden-relation extracting portion 112 performs a morphological analysis of each of documents of a set-of-documents 160 the hidden-relation extracting portion 112 receives from the document-type identifying portion 110 of the management server 100 (s51). FIG. 10 illustrates an example of a result of the morphological analysis.

Next, the hidden-relation extracting portion 112 uses, as parameters, the result-of-the-morphological-analysis 900 that has been obtained in above s51, and the dictionary-of-names-of-devices-and-names-of-processes 1171 and the synonym dictionary 1172 that have been obtained in s50. Further, the hidden-relation extracting portion 112 refers to the function-pointer table 1601 to call and execute the program-for-extracting-candidate-and-feature 1602 that corresponds to the template number 1600 selected by a user (s52). Consequently, candidates-for-hidden-relations 161 are calculated similarly as the flowchart in FIG. 9.

Further, based on the above result-of-the-morphological-analysis 900, and the dictionary-of-names-of-devices-and-names-of-processes 1171 and the synonym dictionary 1172, the hidden-relation extracting portion 112 calculates features of the candidates-for-hidden-relations 161 that have been obtained in above s52 (s53).

Next, the hidden-relation extracting portion 112 compares sets of words of the above candidates-for-hidden-relations 161 with the dictionary-of-names-of-devices-and-names-of-processes 1171 and the synonym dictionary 1172. Based on whether the dictionary-of-names-of-devices-and-names-of-processes 1171 or the synonym dictionary 1172 defines each of the sets of words or a synonym of each of the sets of words, the hidden-relation extracting portion 112 determines a label for each of the sets of words, and assigns a label to each of the sets of words (s54).

Further, the hidden-relation extracting portion 112 uses predetermined machine-learning algorithms to learn a model that allows a label to be inferred from features of each of the candidates-for-hidden-relations 161 (s55). Further, the hidden-relation extracting portion 112 calculates a probability of existence of a relation of each of the candidates-for-hidden-relations 161 (s55).

On the other hand, a portion-that-automatically-determines-validity-of-hidden-relations 113 of the above structured-data generating server 150 refers to the information-on-relations-that-will-be-extracted 117 to obtain information-on-servers-that-can-extract-hidden-relations (s55).

The portion-that-automatically-determines-validity-of-hidden-relations 113 obtains, from each of servers that appear in the information-on-servers-that-can-extract-hidden-relations that has been obtained in s55, that is to say other structured-data generating servers 150, a value of a probability of existence of a relation of each of the candidates-for-hidden-relations (s56). The candidates-for-hidden-relations have been extracted by the hidden-relation extracting portion 112 (that is an agent that performs the flowchart in FIG. 17) of the structured-data generating server 150 that includes the portion-that-automatically-determines-validity-of-hidden-relations 113.

Next, the portion-that-automatically-determines-validity-of-hidden-relations 113 collects probabilities of existence of relations of the candidates-for-hidden-relations. The probabilities of existence of relations of the candidates-for-hidden-relations have been obtained in s56. Further the portion-that-automatically-determines-validity-of-hidden-relations 113 classifies the candidates-for-hidden-relations extracted by the hidden-relation extracting portion 112 of the structured-data generating server 150 that includes the portion-that-automatically-determines-validity-of-hidden-relations 113. The candidates-for-hidden-relations are classified into a set of false POSITIVE candidates, a set of false NEGATIVE candidates, and a set of valid candidates (s57). The portion-that-automatically-determines-validity-of-hidden-relations 113 supplies the set of false POSITIVE candidates, the set of false NEGATIVE candidates, and the set of valid candidates to an inferred-contributing-feature-and-document determining portion 114 of the management server 100.

The above set of false POSITIVE candidates includes sets of words that have not been detected. It should have been determined that probabilities of existence of the sets of words are high, and thus a value "true (t)" should have been assigned to the sets of words. However, it has been determined that probabilities of existence of the sets of words are not high, and thus a value "false (f)" has been assigned to the sets of words.

Further, the above set of false NEGATIVE candidates includes sets of words that have been wrongly detected. It should have been determined that probabilities of existence of the sets of words are not high, and thus a value "false (f)" should have been assigned to the sets of words. However, it has been determined that probabilities of existence of the sets of words are high, and thus a value "true (t)" has been assigned to the sets of words.

Next, the inferred-contributing-feature-and-document determining portion 114 adds one to "No Good" counters of features and original documents that have been main factors of the determination of the above set of false POSITIVE candidates (s58). Values of the "No Good" counters are stored in the storage device 151, for example. Values of "No Good" counters described below are also stored in the storage device 151, for example.

Further, the inferred-contributing-feature-and-document determining portion 114 adds one to "No Good" counters of features and original documents that have been main factors of the determination of the above set of false NEGATIVE candidates (s59).

Further, the inferred-contributing-feature-and-document determining portion 114 adds one to "Good" counters of features and original documents that have been main factors of the determination of the above set of valid candidates (s60).

What is called inverse analysis of machine-learning algorithms is appropriately applied as an above technique that identifies factors of determination.

Figure 19A:
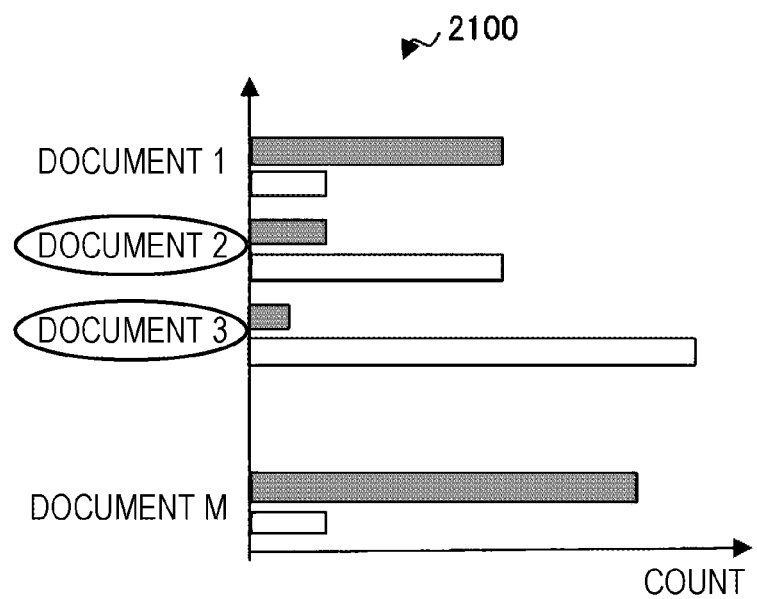
FIG. 19A is a graph that illustrates an example 1 of output according to the present preferred embodiment.
Figure 19B:
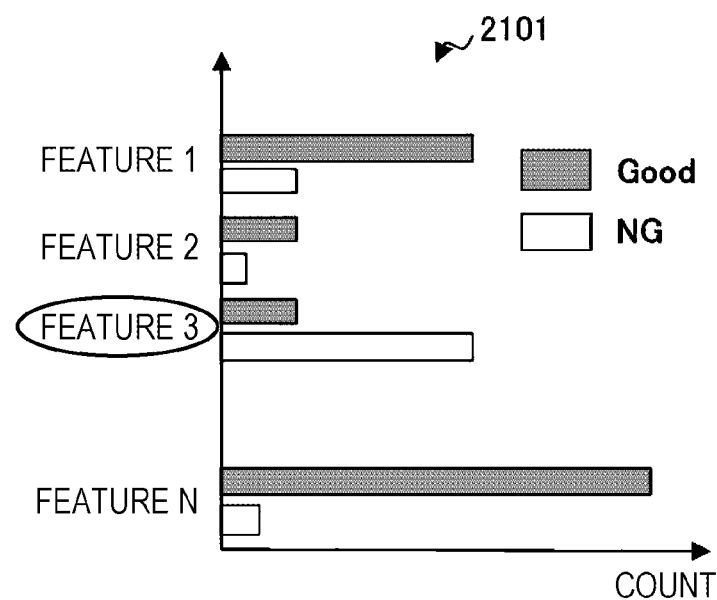
FIG. 19B is a graph that illustrates an example 2 of output according to the present preferred embodiment.

Further, the inferred-contributing-feature-and-document determining portion 114 displays, by means of one of the output devices 106, values of the counters related to the features and the documents that have been updated in above s58 to s60, that is to say results of sum (see FIGS. 19A and 19B) (s61). FIG. 19A illustrates an example of display of values of the "Good" counters and the "No Good" counters of the documents. FIG. 19B illustrates an example of display of values of the "Good" counters and the "No Good" counters of the features.

Figure 20:
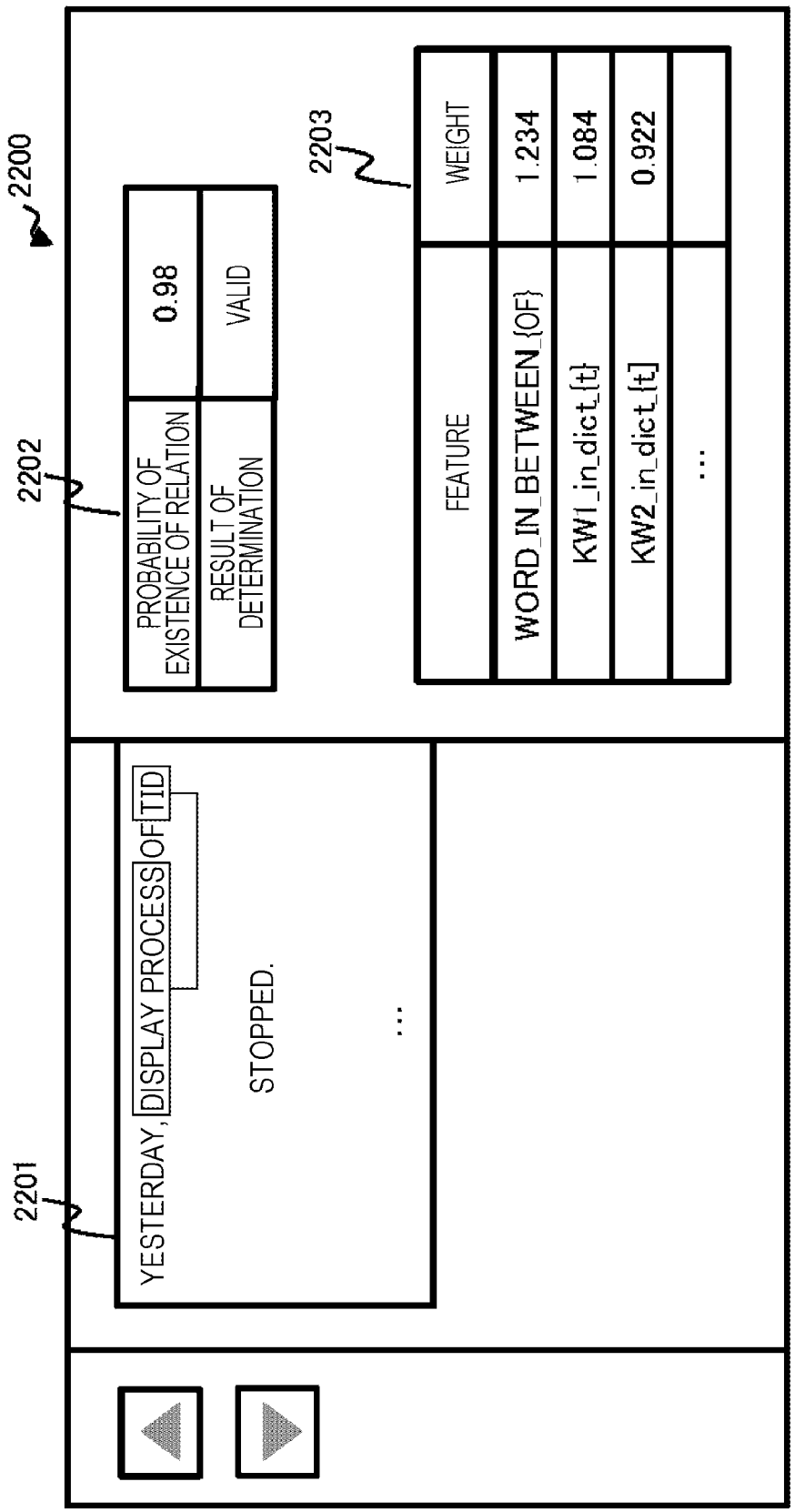
FIG. 20 is a diagram that illustrates an example 3 of output according to the present preferred embodiment.

For example, if an object of a "No Good" document or a "No Good" feature is clicked on a screen on which the above example of display is output, the inferred-contributing-feature-and-document determining portion 114 displays, by means of one of the output devices 106, a display-of-detailed-information 2200, as illustrated in FIG. 20.

The display-of-detailed-information 2200 includes a section 2201 that displays a document, a section 2202 that displays a probability of existence of a relation of the document, that is to say a probability of existence of a relation of a candidate-for-hidden-relation, and a section 2203 that displays features and weights of the features of the candidate-for-hidden-relation. The weights are model information. The information in each of the sections is based on information the inferred-contributing-feature-and-document determining portion 114 has stored in a memory and the like in previous processes.

Figure 21:
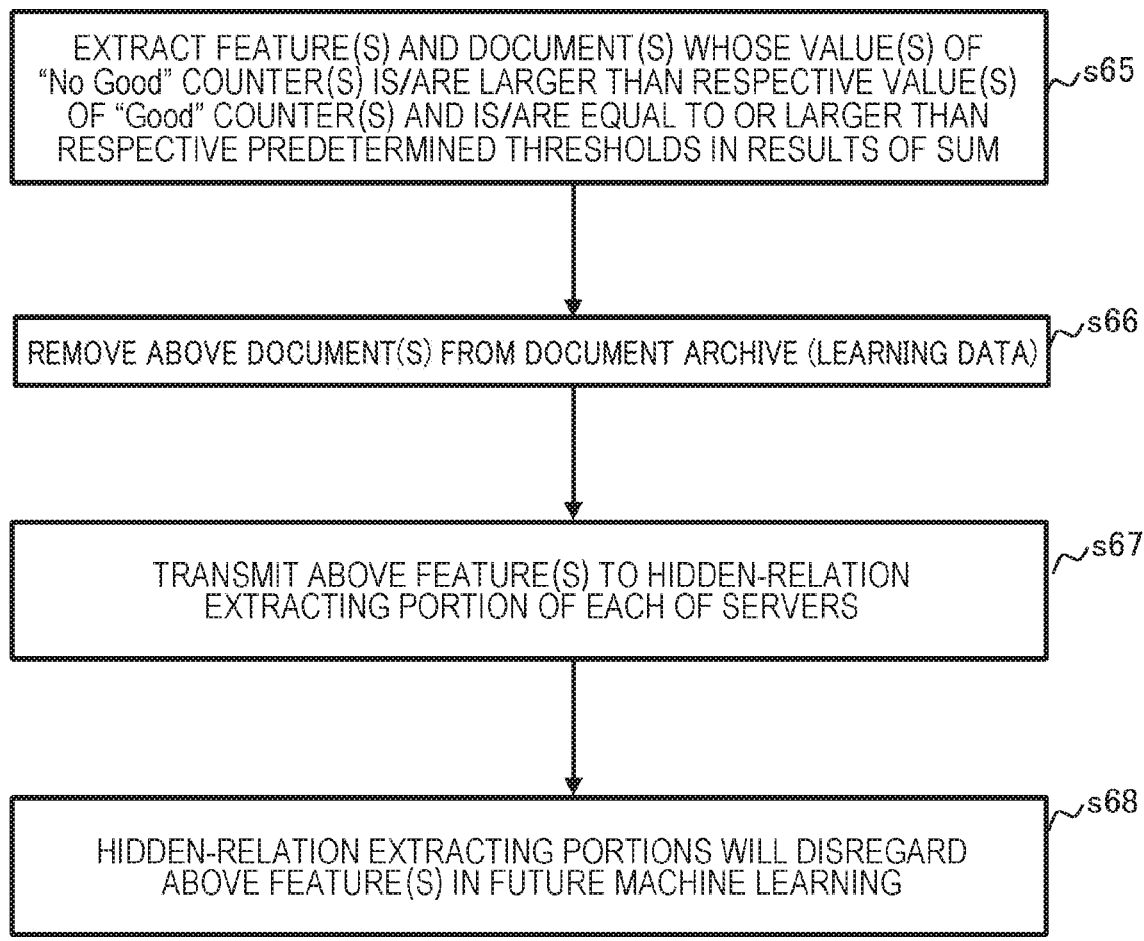
FIG. 21 is a flowchart that illustrates a flowchart example 8 of a word extraction assistance method according to the present preferred embodiment.

Next, as illustrated in a flowchart in FIG. 21, a low-quality-document-and-low-quality-feature removing portion 115 of the management server 100 extracts feature(s) and document(s) whose value(s) of the "No Good" counter(s)" is/are equal to or larger than respective value(s) of the "Good" counter(s) and is/are equal to or larger than respective predetermined thresholds in the above results of sum (s65).

The low-quality-document-and-low-quality-feature removing portion 115 removes, from the document archive 116, the document(s) extracted in s65 (s66).

Next, the low-quality-document-and-low-quality-feature removing portion 115 notifies, to the hidden-relation extracting portions 112 of the structured-data generating servers 150, the feature(s) extracted in s65 (s67).

On the other hand, the hidden-relation extracting portions 112 of the structured-data generating servers 150 will disregard, in a process in future machine learning, the feature(s) notified to the hidden-relation extracting portions 112 in s67 (s68).

The preferred embodiment of the present invention and the like are specifically described above. However, the present invention is not limited to the preferred embodiment of the present invention and the like. Various modifications may be made to the present invention without departing from the spirit of the present invention.

According to the present preferred embodiment, synonyms and related words are efficiently and accurately extracted.

The present description discloses at least the following. That is to say, in the word extraction assistance system according to an aspect of the present invention, in generating the candidate-for-structured-data, the calculation device may extract, from the document archive, a plurality of documents that each contain a set of words that has been selected by a user, and may use algorithms that are different for each of the plurality of documents to generate candidates-for-structured-data, and may perform the determination of validity to determine validity of one or some of the candidates-for-structured-data whose certainty is equal to or lower than a predetermined level, and the determination of validity is based on an algorithm that is different from the algorithms that have been used by an agent that has generated the candidates-for-structured-data.

Consequently, the algorithms are used to extract respective different types of features. Each of the algorithms is used to generate the candidates-for-structured-data from the documents. If validity of one or some of the candidates-for-structured-data is/are doubtful, another algorithm is used to determine validity of the one or some of the candidates-for-structured-data. Thus, validity of the candidates-for-structured-data can be accurately determined. Therefore, synonyms and related words can be more efficiently and more accurately extracted.

In the word extraction assistance system according to the present preferred embodiment, the plurality of documents that the calculation device extracts from the document archive may be documents that each contain the set of words and meet a document attribute that has been selected by a user.

Consequently, the documents in the document archive are appropriately classified based on a classification standard based on knowledge of a domain expert (i.e. rules related to a document attribute), for example. From the classified documents, the candidates-for-structured-data are generated. Therefore, synonyms and related words are more efficiently and more accurately extracted.

Further, in the word extraction assistance system according to the present preferred embodiment, the calculation device may generate the candidates-for-structured-data of all documents contained in the document archive, and may classify the candidates-for-structured-data into groups of the candidates-for-structured-data, the certainty is different between the groups of the candidates-for-structured-data, and, based on a result of the classification, the calculation device may determine whether documents that correspond to the candidates-for-structured-data are processed using the different algorithm.

Consequently, the documents in the document archive are preliminarily classified into groups of the documents, and features of the documents are different between the groups of the documents. The classified documents are used as a resource from which the above candidates-for-structured-data are generated. Therefore, synonyms and related words are more efficiently and more accurately extracted.

In the word extraction assistance system according to the present preferred embodiment, the calculation device may use a predetermined algorithm to analyze a feature and a document that contribute to wrong detection or valid detection of the candidates-for-structured-data, the wrong detection or valid detection of the candidates-for-structured-data is validity or invalidity of the candidates-for-structured-data, based on the determination of validity, and the calculation device may remove a feature and a document whose evaluated qualities are low based on a result of the analysis.

Consequently, qualities of the documents in the document archive, that is to say qualities of documents as teaching data are improved. Further, validity of the candidates-for-structured-data is improved. Therefore, synonyms and related words are more efficiently and more accurately extracted.

In the word extraction assistance method according to the present preferred embodiment, in generating the candidate-for-structured-data, the information processing system may extract, from the document archive, a plurality of documents that each contain a set of words that has been selected by a user, and may use algorithms that are different for each of the plurality of documents to generate candidates-for-structured-data, and may perform the determination of validity to determine validity of one or some of the candidates-for-structured-data whose certainty is equal to or lower than a predetermined level, and the determination of validity is based on an algorithm that is different from the algorithms that have been used by an agent that has generated the candidates-for-structured-data.

In the word extraction assistance method according to the present preferred embodiment, the plurality of documents that the information processing system extracts from the document archive may be documents that each contain the set of words and meet a document attribute that has been selected by a user.

In the word extraction assistance method according to the present preferred embodiment, the information processing system may generate the candidates-for-structured-data of all documents contained in the document archive, and may classify the candidates-for-structured-data into groups of the candidates-for-structured-data, the certainty is different between the groups of the candidates-for-structured-data, and, based on a result of the classification, the information processing system may determine whether documents that correspond to the candidates-for-structured-data are processed using the different algorithm.

In the word extraction assistance method according to the present preferred embodiment, the information processing system may use a predetermined algorithm to analyze a feature and a document that contribute to wrong detection or valid detection of the candidates-for-structured-data, the wrong detection or valid detection of the candidates-for-structured-data is validity or invalidity of the candidates-for-structured-data, based on the determination of validity, and the information processing system may remove a feature and a document whose evaluated qualities are low based on a result of the analysis.

What is claimed is:

1. A word extraction assistance system comprising:
a storage device that stores a document archive, including a plurality of documents, that is a subject of following steps, and a dictionary that defines relations between words; and
a calculation device including one or more processors configured to perform the steps of:
classifying the plurality of documents stored in the document archive according to one or more document identification rules, to identify a set of documents having a given classification;
comparing predetermined words included in a document from the set of documents having the given classification and contained in the document archive with the dictionary, wherein the predetermined words are selected by a user;
generating candidate-for-structured-data related to relations between predetermined words selected by the user and the dictionary, wherein generating the candidate-for-structured-data comprises:
extracting, from the document archive, the set of documents that each contain a set of words selected by a user; and
applying, for each of the set of documents, a respective algorithm from a plurality of algorithms specific to a respective document of the set of documents to generate candidates-for-structured-data;
computing a probability of the candidate-for-structured data related to the relations between the predetermined words selected by the user and the dictionary based on a plurality of features included in the document, the plurality of features comprising a first word included in the document, a second word included in the document, and a number of words between the first word and the second word, and comparing the plurality of features included in the document with machine-learning data to compute the probability;
applying a predetermined threshold to the computed probability to determine whether the candidate-for-structured data is related to the predetermined word selected by the user; and
adding the candidate-for-structured-data to the dictionary responsive to the computed probability of the candidate-for-structured data satisfying the predetermined threshold.

2. The word extraction assistance system according to claim 1, wherein
the set of documents that the calculation device extracts from the document archive are documents that each contain the set of words and have the given classification that has been selected by a user.

3. The word extraction assistance system according to claim 1, wherein the calculation device selects the respective algorithm from the plurality of algorithms based on a result of the classification of the plurality of documents.

4. A word extraction assistance method, comprising:
classifying, by an information processing system comprising one or more processors and a storage device that stores a document archive including a plurality of documents, and a dictionary that defines relations between words, the plurality of documents stored in the document archive according to one or more document identification rules, to identify a set of documents having a given classification;
comparing predetermined words included in a document from the set of documents having a given classification and contained in the document archive with the dictionary, wherein the predetermined words are selected by a user;
generating candidate-for-structured-data related to relations between predetermined words selected by the user and the dictionary, wherein generating the candidate-for-structured-data comprises:
extracting, from the document archive, the set of documents that each contain a set of words selected by a user; and
applying, for each of the set of documents, a respective algorithm from a plurality of algorithms specific to a respective document of the set of documents to generate candidates-for-structured-data;
computing a probability of the candidate-for-structured data related to the relations between the predetermined words selected by the user and the dictionary based on a plurality of features included in the document, the plurality of features comprising a first word included in the document, a second word included in the document, and a number of words between the first word and the second word, and comparing the plurality of features included in the document with machine-learning data to compute the probability;

applying a predetermined threshold to the computed probability to determine whether the candidate-for-structured data is related to the predetermined word selected by the user; and adding the candidate-for-structured-data to the dictionary responsive to the computed probability of the candidate-for-structured data satisfying the predetermined threshold.

5. The word extraction assistance method according to claim 4, wherein the set of documents that the information processing system extracts from the document archive are documents that each contain the set of words and have the given classification that has been selected by a user.

6. The word extraction assistance method according to claim 4, further comprising selecting the respective algorithm from the plurality of algorithms.

* * * * *